Aug. 4, 1970  D. L. HALL ET AL  3,523,232
JERK, ACCELERATION, AND VELOCITY LIMITED POSITION PATTERN
GENERATOR FOR AN ELEVATOR SYSTEM
Filed July 6, 1964  11 Sheets-Sheet 2
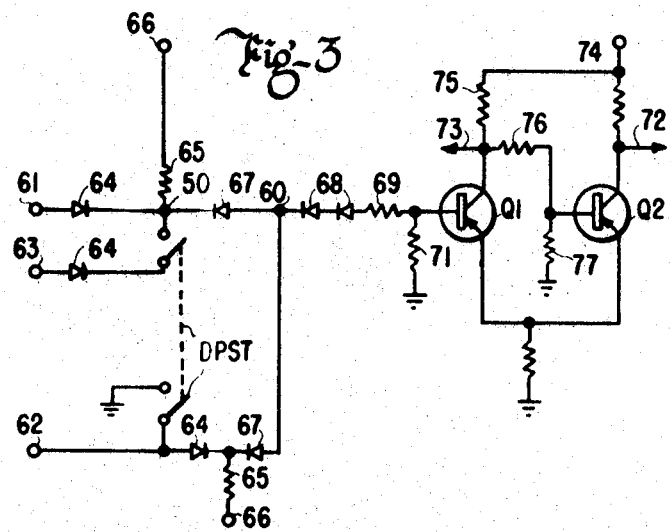
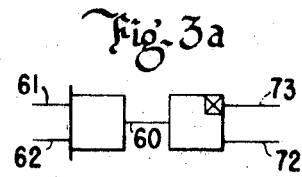
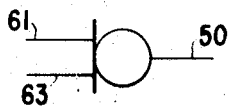
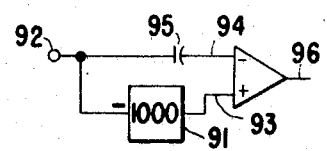
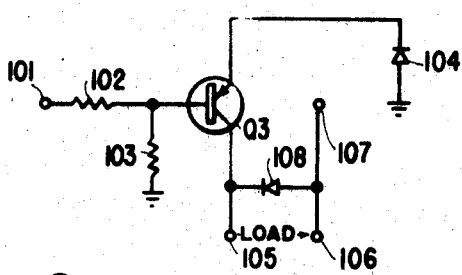
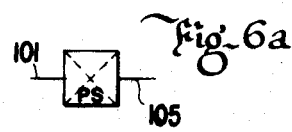
INVENTORS.
DONIVAN L. HALL
RICHARD C. LOSHBOUGH
BY GERALD D. ROBASZKIEWICZ
Marshall, Wilson & Yeasting
— attys —

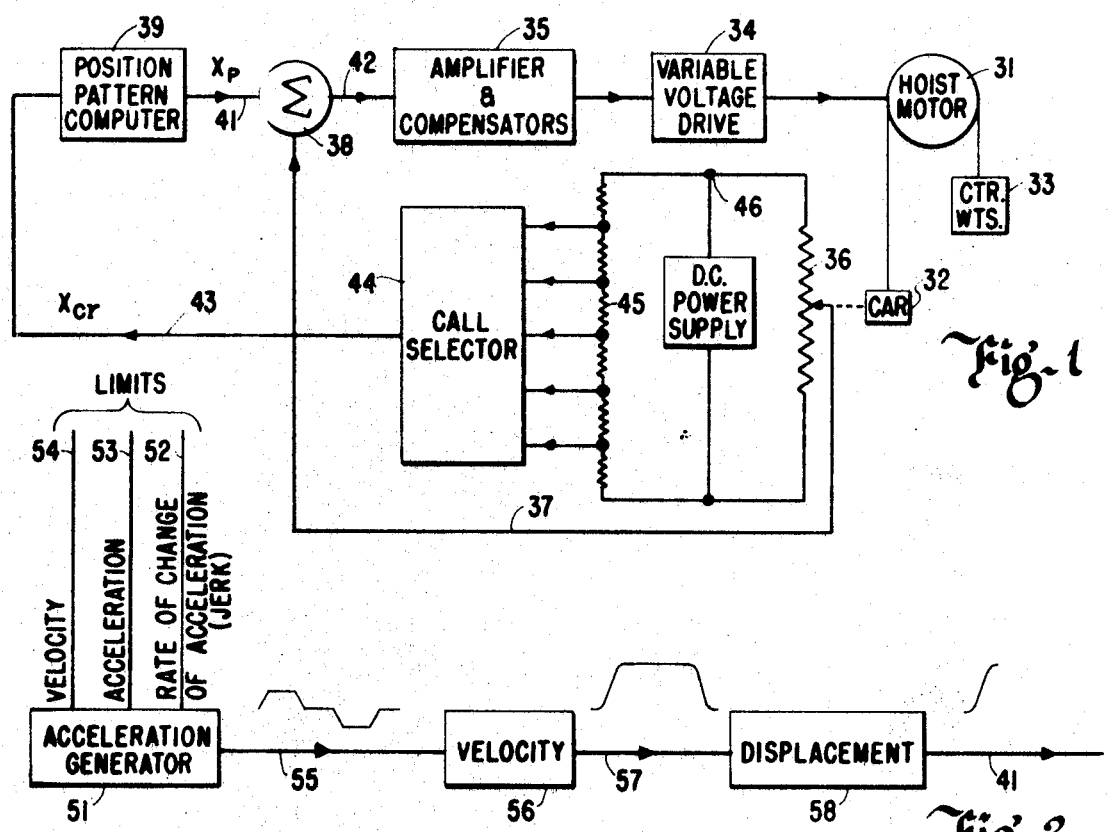
Fig-1
Fig-2
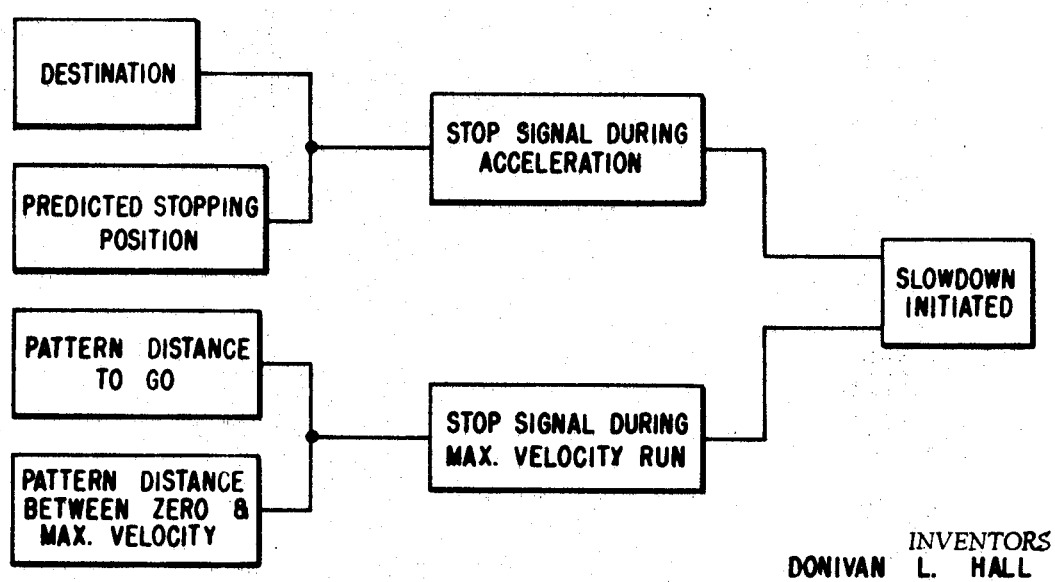
Fig-12
INVENTORS
DONIVAN L. HALL
RICHARD C. LOSHBOUGH
BY GERALD D. ROBASZKIEWICZ
Marshall, Wilson & Yeasting
attys.

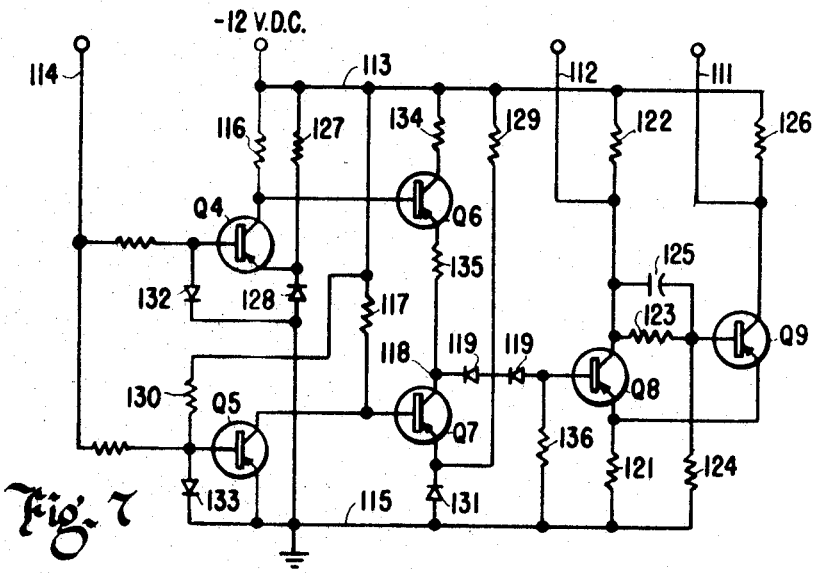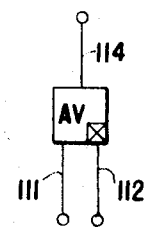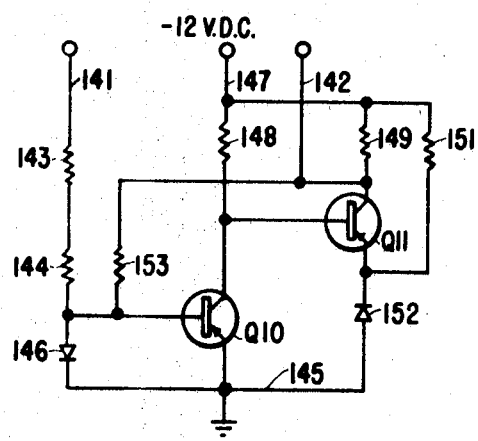

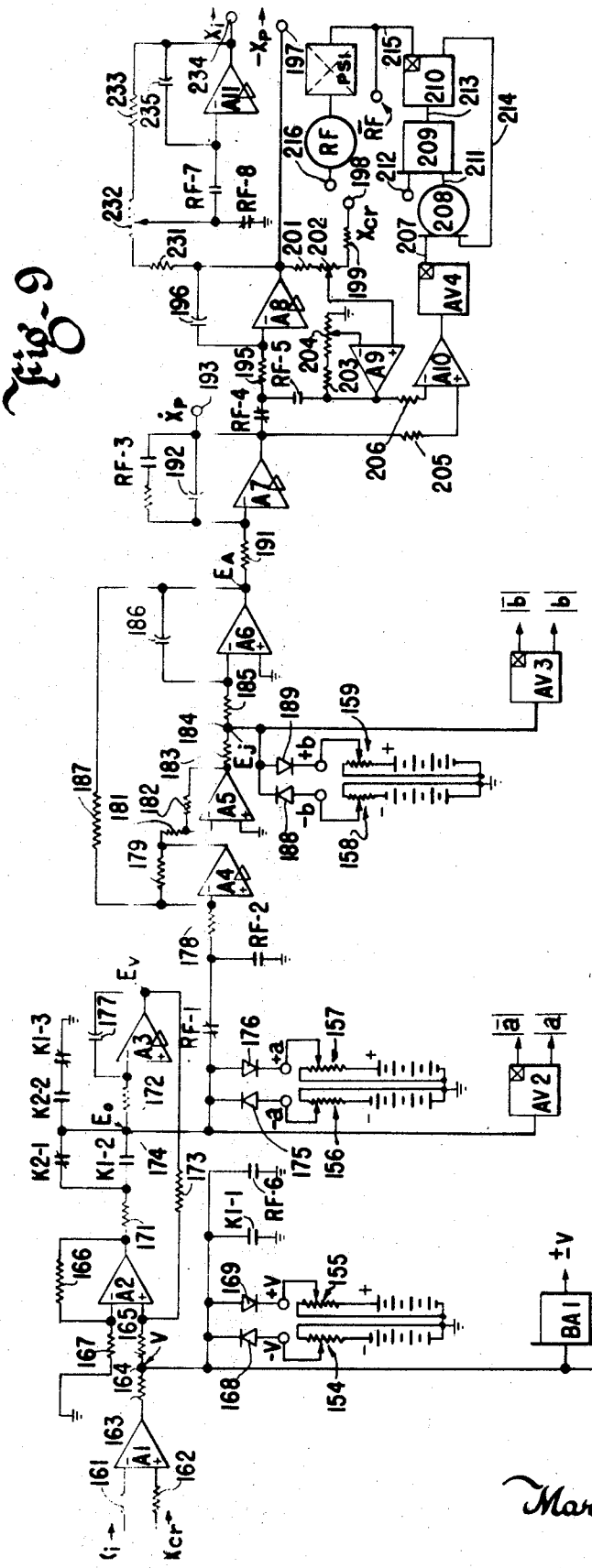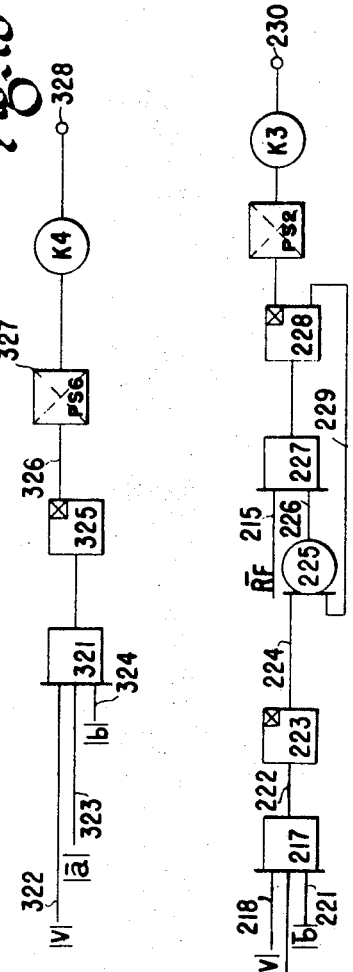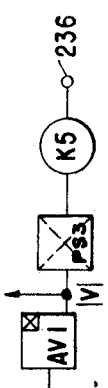
Aug. 4, 1970     D. L. HALL ET AL     3,523,232
JERK, ACCELERATION, AND VELOCITY LIMITED POSITION PATTERN
GENERATOR FOR AN ELEVATOR SYSTEM
Filed July 6, 1964     11 Sheets-Sheet 4
*Fig-9*
*Fig-15*
*Fig-14*
INVENTORS.
DONIVAN L. HALL
RICHARD C. LOSHBOUGH
GERALD D. ROBASZKIEWICZ
BY Marshall, Wilson & Yeasting
—attys—

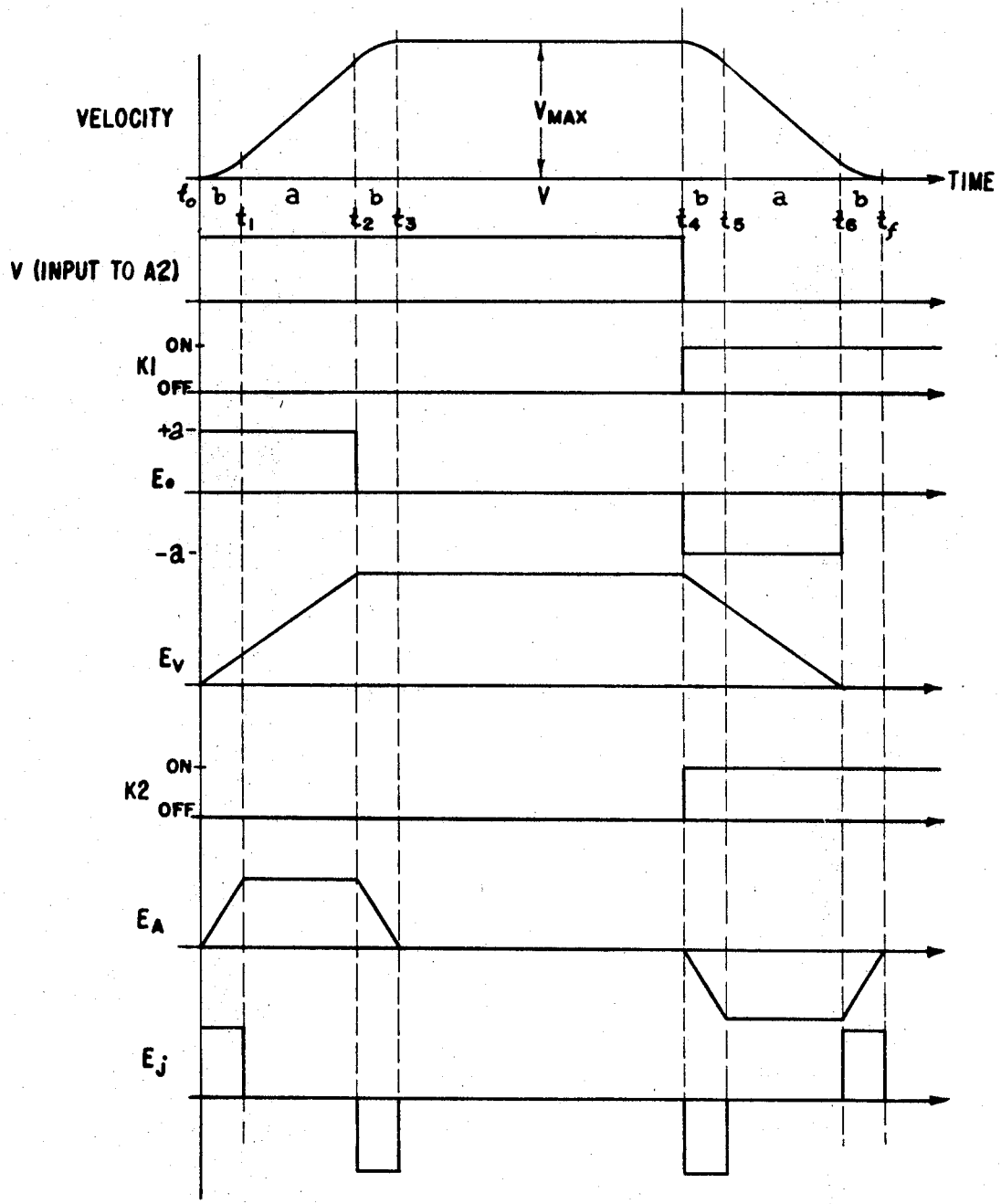

INVENTORS.
DONIVAN L. HALL
RICHARD C. LOSHBOUGH
BY GERALD D. ROBASZKIEWICZ

Marshall, Wilson & Yeasting
attys

INVENTORS.
DONIVAN L. HALL
RICHARD C. LOSHBOUGH
BY GERALD D. ROBASZKIEWICZ

Marshall, Wilson & Yeasting
—attys—

United States Patent Office 3,523,232
Patented Aug. 4, 1970

3,523,232
JERK, ACCELERATION, AND VELOCITY LIMITED POSITION PATTERN GENERATOR FOR AN ELEVATOR SYSTEM
Donivan L. Hall, Richard C. Loshbough, and Gerald D. Robaszkiewicz, Toledo, Ohio, assignors, by mesne assignments, to The Reliance Electric and Engineering Company, Cleveland, Ohio, a corporation of Ohio
Filed July 6, 1964, Ser. No. 380,385
Int. Cl. G05b 5/01
U.S. Cl. 318—611                                       25 Claims

ABSTRACT OF THE DISCLOSURE

An elevator hoist motor control employing a high gain amplifier with suitable compensation to insure stability to apply a control signal derived from the difference between a time based commanded position signal and a signal representative of the actual car position. The commanded position signal is derived by two integrations as a function of time of a precisely defined commanded acceleration signal subject to constraints of constant rate of change of acceleration or jerk, acceleration, and velocity. Jerk, acceleration and velocity values are adjustable. Values of jerk, acceleration and velocity are utilized to compute the position at which the car would stop is ordered to stop at any instant during its travel. Correspondence of computed stop position and the destination of the car institutes a stop pattern without reference to the actual car position. Suitable controls are set forth to avoid unsafe operation.

This invention relates to positioning controls and more particularly as illustrated herein to controls for determining the position of a movable body such as an elevator.

Heretofore it has been known to control the position of movable bodies by establishing a command signal to which the driving element for the body responds. These systems have included some means to ascertain the position of the body and indicate to the driving means the difference between actual position and commanded position. As applied in the machine tool art a number of means for generating position commands have been undertaken including punched tapes which control the steps in the drive elements for positioning the tool or body upon which the tool is working, magnetic tape records of control patterns, pattern developing devices which follow a particular physical configuration in the manner of a pantograph and fixed program devices which issue steps on a time basis or on a positional step by step basis. In this type of application the values of velocity and acceleration ordinarily are not precisely defined. Further relatively sharp transitions in velocity and acceleration as are tolerable in the limits of the operating tools or equipment are permitted and frequently are sought in the interest of expediting the processing by the tools. In some operations such as rolling mills even final position is not critical.

The present invention is illustrated as applied to elevator systems wherein much effort has been expended with respect to providing means to automatically position elevator cars. Past efforts in this area generally have followed a philosophy of utilizing timed steps discretely issued to an elevator hoist motor to control that motor. Such steps ordinarily are responded to rather sluggishly in order that they are not reflected in the riding characteristics of the elevator. A paramount consideration in high quality elevator service is the comfort of the passengers. These considerations impose limitations on the tolerable acceleration and rates of change of acceleration which can be applied. Also an elevator must be precisely positioned so that its floor is level with the landing threshold at which passengers are given the opportunity to transfer between the car and the landing. Floor to floor time is a major criteria of high caliber elevator service and maximum smooth acceleration is sought in achieving these rapid floor to floor times. The loadings imposed upon elevator controls extend over a wide range. They include in a counterbalanced elevator car, balanced loading, loading in excess of balance through a range from balance to full capacity and loadings less than balance over a substantial range. Thus in some instances the elevator car tends to overhaul the drive. In other instances the drive is required to haul the load. These loadings can occur in either direction of travel and therefore in the past have greatly complicated the problem of attaining uniform high quality operating characteristics for all ranges of loading and all directions of travel.

Attempts have been made to apply controls employing potentials representing desired position and potentials representing present position to elevators. Graham, U.S. Pat. 1,970,304 of Aug. 14, 1934 for "Elevator and Like Apparatus," discloses a motor driven potentiometer as a call position indicator wherein a call causes the potentiometer contact to be driven against a mechanical stop which defines the effective location of the demand. The elevator position controls a potentiometer which is connected into a bridge with the call location potentiometer. A given potential difference turns the hoist motor on to cause the car to be carried toward the call and to progressively reduce that difference. As the potential difference is reduced below a predetermined level a switch is operated to slow the hoist motor and when the car position potential balances the call position potential the car is stopped.

The Graham type of control offered only coarse control of motor speed, responded to but one call at a time, it could not respond to supplemental calls which it passed in traveling to the call which placed it in operation, and it was quite inflexible.

A somewhat more refined control for elevators is disclosed in Bruns U.S. Pat. 2,699,226 of Jan. 11, 1955 for Elevator Control System. Bruns proposed balancing the signals from potentiometers representative of effective car position and call positions. The effective car position was defined by an actual car position potential plus an advance potential developed by a motor driven potentiometer which in essence placed the potential representative of car position in advance of actual car position an amount sufficient to permit the slowing and stopping of the car at a call producing a matching potential. The advance potential also determined the operation speed steps in a motor controller by actuating switches.

Systems of the type described require precise mechanical drives. They are relatively slow to respond to changed conditions. They do not lend themselves to continuous control of an elevator hoist motor but rather employ steps of control which must be damped if an acceptable ride is to be obtained. Their operation is rigidly defined for a given system and requires substantial redesign and engineering for each system to which they are applied. They are based upon car position to determine their command signals.

A preferred elevator motor control has been a direct current motor having a variable voltage source for its armature and a shunt field winding that can be energized at a constant level or within some limited range of variation to provide speed control. This type of control has been subjected to much refinement and to the superposition of auxiliary equipment in an effort to achieve optimum and uniform riding characteristics. These have included numerous compensation means for variations in load, speed signal developing means which are fed back to the motor control, variable braking means dependent upon motor speed, supplemental motors to absorb some of the load torque particularly as the car is brought to a landing and regulating generators responding to many of the factors noted above including speed, loading and direction of travel.

Frequently such variable voltage controls have been adjusted to incipient instability in an effort to achieve the maximum characteristics wherein adjustment has been critical, requiring the efforts of highly skilled personnel to adjust and frequency re-adjust the system. Further, apparently identical lifting motors and lifting motor controls often require different adjustments and provide different operating characteristics under identical conditions. These systems have been sensitive to temperature variations, to brush and commutator condition, to brush position and to aging.

It is an object of the present invention to generate a precise pattern for the positioning of a movable body as a function of time.

Another object is to selectively constrain the position pattern utilized in controlling the motion of a body to selectable values of velocity, acceleration and rate of acceleration.

Another object is to selectably establish maximum first, second and third time derivatives of displacement for a movable body.

A fourth object is to control precisely the position with respect to time of a movable body in response to a command signal.

A fifth object is to minimize the flight time between a starting and terminating position for any selected amount of travel and combination of a wide range of selected maximum velocity, selected acceleration and selected rate of change of acceleration of a movable body.

Another object is to increase the accuracy of the determination of stopping distances for any length of run of a moving body.

A seventh object is to enable a moving body to respond to a signal requiring its stop or deceleration while in transit and up to the last possible instant that the body can respond to that signal within the constraints of the velocity, acceleration and rate of change of acceleration imposed upon the system.

An eighth object of the invention as applied to elevators is to accommodate any travel of an elevator between landings over any length of total travel.

Another object is to simplify the adjusting procedures required to establish the operating parameters of a system driving a movable body.

Another object is to stabilize the conditions imposed upon a control system for a moving body whereby drift of operating characteristics and deterioration of such characteristics with time is avoided.

Another object is to suppress or eliminate the effects of unbalanced load, hysteresis, non-linearities of elements, deviations due to manufacturing tolerances and the effects of temperature and line voltage variations on the control of elevator hoist motors.

A further object is to enable any of a plurality of different driving devices to be controlled by a common type of pattern control, and particularly as applied to elevators to enable the substitution of elevator hoist motors of various ratings in accordance with the dictates of the specifications applicable to the elevator installation with assurance that the control will afford operating characteristics up to the limits of the capability of the hoist motor.

In accordance with the above objects, one feature of this invention involves a displacement vs. time pattern signal generator having internal logic and programming to mathematically integrate preselected limiting values of the first, second and third derivative of displacement to generate the optimum position command signal for such values. Included within the signal generator are limiting means to define the maximum levels of velocity, the first derivative of displacement, acceleration, the second derivative of displacement, and rate of change of acceleration, the third derivative of displacement.

A second feature of the invention involves a stopping distance computer including logic means for accepting or rejecting stopping commands received while the movable element responding to the displacement vs. time computer is in transit. The position of the body relative to the location along its path of travel of the stop for which the stopping command was issued, the velocity of the body and the limitations on acceleration and rate of change of acceleration are considered in the logic decisions involved in ascertaining the stopping distance. This computer accommodates any state of movement in which the body may be at the time the moving body should accept or reject a stopping command, that is, the body can be moving at its maximum velocity, it can be in its accelerating condition, and it can be changing its acceleration. In each of these circumstances the stopping distance computer takes into consideration the velocity of the body and the limits on the acceleration which can be imposed and the rate of change of acceleration which can be imposed so that the transition to a stopping mode is made at the last possible instant, thereby insuring that the most rapid transit available within the constraints imposed upon the system will be realized.

Another feature resides in equipment for determining the optimum point as the command signal approaches the stop to transfer from an initial positioned based command signal to a final position based command signal and means for effecting this transfer without discontinuity in the command signal as issued to the driving means.

Another feature resides in matching the equipment of the aforenoted features with existing elevator equipment to provide a compatible system having a wide range of applicability.

An additional feature involves a closed loop position servo system for an elevator hoist motor employing unique compensating networks to stabilize the system with needed D.C. gain and to provide the required bandwidth with adequate phase margin to force the elevator to accurately reproduce the computed position command signal.

One embodiment of the invention illustrating the above and additional features comprises an elevator system including an elevator car serving a plurality of landings in response to the registration of calls for service. The elevator car is driven by a direct current motor having a separately excited shunt field and a variable voltage supply for its armature. One suitable supply is a Ward-Leonard system including a direct current generator having its armature connected to the motor armature and a shunt field which is supplied from a suitable source such as a group of controlled rectifiers. Phase control of the rectifiers is provided by a firing circuit which enables both the direction and magnitude of current in the shunt field to be controlled.

An amplifier provides a signal which controls the firing circuits and is coupled with a compensator effectively comprising two lag-lead networks, and two lead-lag networks, one of which can be supplanted by a hoist motor speed feedback signal, to provide the proper phase and gain of the signal as a function of signal frequency whereby the D.C. gain can be at a high level. Control of the signal is by means of a position error signal. Hence the D.C. gain of the forward loop must be sufficient to reduce the position error of the elevator car caused by unbalanced loads to acceptable limits.

The error signal is in the form of a voltage derived from the comparison of a car position voltage and a position as a function of time command voltage. The car position voltage can be developed in a potentiometer driven by car motion as by a cable coupling to the car and may be in the form of a helix having its contactor driven in a helical path relative to its card. The command voltage is generated in a computer.

Position as a function of time is computed by developing a potential difference between an initial car position voltage, $X_i$, and a call request voltage, $X_{cr}$, which is characteristic of the voltage the car position potentiometer would issue if the car were at the location of the request. The sign of this difference voltage indicates the direction of the call from the car, positive being above and negative below. The effective magnitude of this voltage is limited by a bidirectional clamp circuit which fixes an absolute level characteristic of the maximum velocity of the elevator car. This velocity limit can be adjusted by adjustment of the clamping circuit. The clamped signal results in a stepped input which is integrated and clamped by a second clamping circuit to produce a ramp. The slope of the ramp represents the acceleration constraints, both positive and negative, and can be adjusted by adjustment of the clamp voltage level. The ramp signal is differentiated to produce a step signal subject to the velocity and acceleration constraints and this signal is integrated subject to limits imposed by a third clamp which defines the positive and negative limits on the rate of change of acceleration or "jerk" to produce a ramp signal to and from the acceleration limit which signal persists for the period required to generate the velocity limit. This signal is the command signal acceleration pattern.

The command signals are derived from the acceleration pattern as a velocity as a function of time by integrating the signal with respect to time and as a displacement as a function of time by a second integration with respect to time.

In order to achieve the requisite landing accuracy the base for the command pattern is shifted to the destination signal at a time when the transfer can be made without a discontinuity in that signal. The command pattern as generated above results in an initial period of constant rate of change of acceleration to a maximum acceleration which continues for a second period until the predetermined maximum velocity is approached, a third period of transition from maximum acceleration to maximum velocity at the rate of change of acceleration, a period of constant velocity, as slowdown is initiated, a fifth period of constant rate of change of acceleration to a maximum negative acceleration, and a period of maximum negative acceleration. Rather than make the transition from maximum negative acceleration to zero velocity at the prescribed rate of change of acceleration, at the time this change is to occur, the pattern is transferred to a signal based upon its distance from the destination and permitted to approach the destination signal level as a function of time, for example as an exponential decay.

The above described pattern can be modified while retaining the constraints of acceleration and rate of change of acceleration for a displacement command less than that required to achieve maximum velocity. When slowdown is initiated during acceleration, the rate of change of acceleration continues through zero acceleration in a smooth transition to negative acceleration.

The elevator control of the illustrative embodiment employs the above described command signal with a stop computer which permits optimum patterns within the acceleration, velocity and rate of change of acceleration constraints imposed. This computer generates a stop position signal and compares it with the destination signal so that the creation of a predetermined relationship of those signals initiates a stopping operation. Three stopping modes are possible: one from maximum velocity, one from acceleration, and one from the transition between acceleration and maximum velocity. The latter form of stop is treated in the same manner as a stop from maximum velocity since the rate of change of acceleration constraints carry the command signal through the maximum velocity if the stop is initiated during that change. In that stopping operation the command continues to change at the defined rate from a positive to a negative acceleration.

A stop from maximum velocity is computed by storing the displacement signal generated in achieving maximum velocity and comparing that signal with the distance remaining to be traversed. This distance is ascertained by subtracting from the destination signal the pattern position signal. When the monitored difference equals the stored signal the transition to deceleration is initiated.

A stop from acceleration is computed by continuously generating the instantaneous stopping position signal during acceleration and comparing it with the destination signal. This computation is made in terms of the initial position signal for the run, the current command signal position, the current command signal velocity, the maximum acceleration setting, and the maximum rate of change of acceleration setting.

The sensing of the destination signal is arranged to enable the command signal to respond to any service demand encountered for a stopping station to which the elevator can be brought to a stop within the acceleration and rate of change of acceleration constraints. At the initiation of a command signal generation, a predetermined station is designated as the destination and a signal therefor generated. Conveniently, a terminal landing can be the destination. As the command signal develops, the stop registering devices for its range of response are sampled. Thus if a command signal has developed two landings of displacement and the computed stopping distance at this moment is two landings, the calls for the fourth landing from the initiation position will be monitored at that moment. If a call is sensed, the system accepts it and initiates a stop sequence for the command signal. If, however, the call was imposed after the elevator could be stopped within its acceleration and rate of change of acceleration constraints, the call would be rejected and the pattern would continue to develop. Once a call is accepted, the destination signal is transferred to the landing of that call and is held until the car has stopped in response to the command signal.

The above and additional objects and features of this invention will be appreciated more fully from the following detailed description when read with reference to the accompanying drawings in which:

FIG. 1 is a functional block diagram of an elevator control system utilizing this invention;

FIG. 2 is a functional block diagram of a command signal generator for producing a signal representative of computed position as a function of time;

FIG. 3 is a schematic diagram of an "and" circuit and Schmitt trigger employed together for "and" logic and an "or" circuit as represented by the logic symbols of FIGS. 3a and 3b respectively;

FIG. 4 is a schematic of a differential amplifier, and the logic symbol for such an amplifier is shown in FIG. 4a;

FIG. 5 is a schematic diagram of chopper stabilized amplifier utilizing in part logic symbols, and FIG. 5a is the logic symbol for such an amplifier;

FIG. 6 is a schematic diagram of a transistor power switch and FIG. 6a is the logic symbol employed therefor;

FIG. 7 is a schematic diagram of an amplifier and Schmitt trigger combined to indicate the presence or absence of an absolute value of a signal and arranged to adapt certain of the signals to the logic functions utilized in the circuits set forth;

FIG. 8 is a schematic diagram of a buffer amplifier to adapt certain signals to the logic functions;

FIG. 9 is a schematic diagram of a command signal generator according to this invention as depicted in FIG. 2 and utilizing logic symbols as illustrated above;

FIG. 10 is a plot against time of velocity, certain relay functions entering into the logic of this control, and a number of voltages as they appear at various positions in the command signal generator shown in FIG. 9, as those wave forms appear for a full speed run;

FIG. 12 is a block diagram of the stopping distance computer according to this invention as it is combined with the command signal generator of FIG. 9;

FIG. 14 is a schematic diagram of an acceleration definer utilized in marking the end of acceleration on the signal generated by the signal generator of FIG. 9;

FIG. 15 is a schematic diagram of means programming the control during changes in acceleration;

FIG. 20 is a compensation network as utilized in the system represented in the block diagram of FIG. 20;

Figure 23:
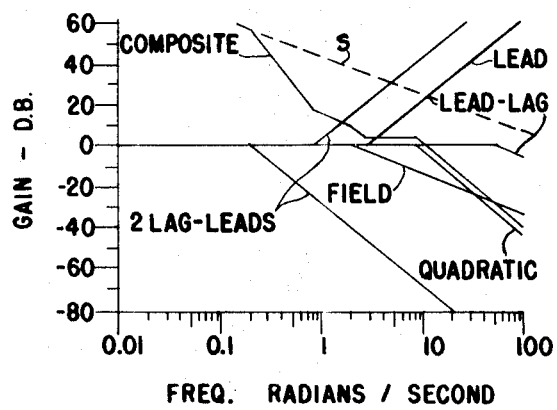
Figure 24:
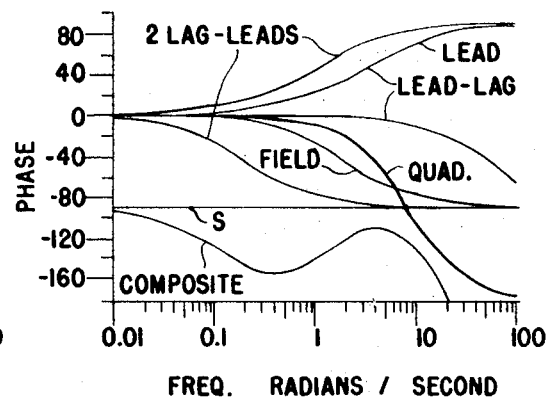
Figure 25:
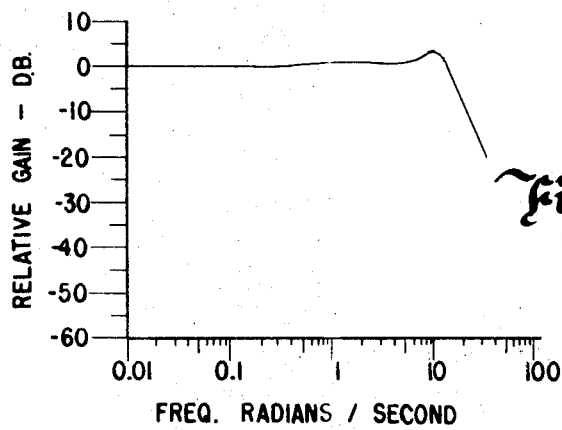

FIGS. 21 through 24 are plots on a semi-logarithmic basis of gain and phase shift plotted against frequency in radians per second to show the open loop characteristics of an elevator system to which this invention might be applied; and FIG. 25 is a semi-logarithmic plot of relative gain against frequency in radians per second showing the characteristics achieved in an elevator system utilizing this invention.

The present invention has been illustrated as applied to an elevator system functionally depicted in the block diagram of FIG. 1. In that system a hoist motor 31, which advantageously from the standpoint of speed control can be a D.C. motor having a separately energized shunt field winding and an armature supplied for speed control from a variable voltage source, drives an elevator car 32. Car 32 is counterweighted as at 33 to compensate for some suitable portion of the rated load of the car, ordinarily 40% of rated load, whereby the load is fully counterweighed when loaded to 40% of capacity, is less than counterbalanced when loaded in excess of 40%, and is overbalanced when loaded to less than 40% of rated capacity. Control of hoist motor speed is determined from a variable voltage source 34 which in the discussion to follow will be a direct current generator having its armature driven from a suitable prime mover at a constant speed and its shunt field current varied to control the voltage it applies to the motor armature, in accordance with well known Ward-Leonard principles. The shunt field of the generator may be supplied from any suitable source as for example a group of silicon controlled rectifiers having phase control firing circuits. Control of the firing circuits or other mechanism for establishing the current flow in the shunt field of the generator is afforded by an amplifier and compensator represented by the rectangle 35.

The amplifier and compensator are so arranged as to afford a relatively high forward gain and a controlled amount of phase shift, whereby the gain is attenuated at frequencies where the system tends to become unstable. The forward loop in which the amplifier and compensator operate extends from summing point 38 through a car position signaling means represented by the potentiometer 36 which issues a voltage on lead 37 representative of car position throughout all positions of travel of the car. The signal on lead 37 is introduced at summing point 38 and is combined with a command signal which commands a car position with time based upon the actuating impulses imposed upon the elevator system. This command is derived from the position pattern generator 39 over lead 41 extending into the summing point 38. From the summing point 38 the error signal resulting from the comparison of the car position signal and the command signal is applied over lead 42 to the amplifier and compensator 35.

Details of the elements outlined above will be set forth in the following description. However, it should be recognized that control stimuli such as calls registered on the conventional car buttons located within the elevator car and those registered at landing buttons for the landings which the elevator car is capable of serving dispatchers for starting cars from stations, and such known features as stops for high car reversal, high call reversal, late car reversal and the like require flexibility in the form of the pattern to be generated. Stimuli placing the position pattern generator in operation can be considered a call request applied to the pattern generator over lead 43 from a call selector 44. The function of the call selector generally is to ascertain the location of landings along the path of travel at which service is required by the elevator car sufficiently in advance of the arrival of the car at the landing to permit the car to be slowed and stopped by a command position signal generated in the position pattern generator meeting the constraints of maximum velocity, maximum acceleration and maximum rate of change of acceleration set into the generator. The position of the call request or destination of the elevator is indicated to the pattern generator as a potential off the string of resistors 45 arranged as a potentiometer with fixed points corresponding to landing positions available to the input to the call selector. The potentiometer 36 and the resistor string 45 are supplied from the same power supply, not shown, connected to terminal 46 and have their opposite ends grounded.

The pattern computer normally remains dormant so long as its output signal represented as a voltage appearing on lead 41 is of the same level as the input voltage derived from the call selector 44 and applied on lead 43. If this input voltage differs from the output of the pattern computer, the computer will, subject to its own control, alter its own output until agreement has been reached. Typically the input will differ from the output only when a new floor position has been called for by the imposition of a demand for elevator service. Thus when a new floor voltage is connected to the computer, the computer generates the position-time pattern required to regain the equality of input to output. In the process the hoist motor for the elevator car is supplied a position-time pattern which it will follow to a new floor position. In advancing its output to the desired new value, the computer regulates the generated position-time pattern in such a manner that the first, second and third time derivatives of displacement are limited and subject to adjustment. The first derivative can be considered the command signal for velocity of the hoist motor and the car, the second derivative can be considered the acceleration and the third derivative can be considered the rate of change of acceleration or jerk.

The negative feedback in the system afforded by applying the car position signal to the summing point in combination with the command position signal provides a high degree of accuracy in the positioning of an elevator subject to no unbalanced load. Since the system responds to an input displacement command, it regulates its output displacement accordingly by comparison of its output position to its input command and utilizes the amplification of the difference or error as derived from the summing point, unbalanced loads will cause errors. However loop gain in a system utilizing position feedback reduces the displacement errors caused by unbalanced loads. Thus in this system gain requirements are set by the unbalanced load to be imposed upon the elevator and the amount of displacement from the landing that is tolerable for maximum unbalanced load. It is when the forward loop gain has been increased to a level reducing the amount of displacement for maximum unbalanced load or the position error for maximum unbalanced load to negligible levels that the system tends to become unstable unless compensators are utilized. Compensation can be obtained by employing suitable lag-lead and lead-lag networks or a combination of lead-lag and lag-lead networks in a composite network.

In the system under consideration suitable accuracy is obtained as to car position by the use of a multi-turn potentiometer corresponding to the potentiometer 36 coupled to the elevator car as by means of a driving cable from the potentiometer to the car to cause rotation of the potentiometer contactor as the car is moved along its path of travel. While the potentiometer has been proposed, it is to be understood that any scheme which could provide a voltage or voltage ratio proportional to car position would be satisfactory in a system of this nature provided stability and resolution were compatible with a requirement of at least plus or minus one-tenth inch positioning accuracy.

Before considering the position time pattern generator a general discussion of the operating theory of a position pattern will be presented. A primary consideration in this presentation is the comfort and safety of human beings conveyed by the moving equipment. Therefore this pattern and the limitations imposed thereon are presented in terms of its utilization with an elevator. However, it is to be appreciated that the general concepts involved are not limited to elevators and have a substantially greater range of application. For example, they can be employed in train control operations or the pattern can be modified to adapt it to suitable machine control functions.

An examination of the possible transitions of pattern voltage where pattern voltage represents position reveals immediately that a transition at a linear rate representing constant car velocity could not be tolerated since the initiation and termination of the motion commanded would require infinite acceleration. Therefore a transition should include a period of acceleration at the initiation of motion and a deceleration at the termination of motion. Passenger comfort dictates that acceleration must not exceed some limits. In elevator applications four feet per second per second is considered quite acceptable. If extremely low accelerations are employed, changes in velocity will be imperceptible. However, in the interest of utilizing the elevator equipment efficiently by completing the run between two stations as rapidly as possible, high rates of acceleration should be employed.

With a finite and constant acceleration, however, the rate of change of acceleration or "jerk" at the initiation and termination of the acceleration periods would be infinite. This also creates an uncomfortable and possibly dangerous condition. Accordingly, a further constraint is that the rate of change of acceleration must be finite and not exceed a selected limit. Again in the interest of efficient utilization of equipment, a rapid rate of change of acceleration should be employed. A rate of eight feet per second$^{-3}$ is acceptable for elevator applications.

In elevator utilizations excellent riding characteristics can be achieved employing constant jerk or rate of change of acceleration from zero speed through a transition period to a period of constant acceleration until the maximum velocity is approached, at which point a constant negative value of rate of change of acceleration is utilized to enter the constant maximum velocity portion of the run. Once full speed has been attained, it is maintained until it is appropriate to initiate the slowdown, such slowdown being accomplished by a transition at a constant negative rate of change of acceleration to constant negative acceleration which is permitted to extend over a period necessary to approach zero speed and the transition from this negative acceleration to zero speed can be made at a constant positive rate of change of acceleration. A plot of velocity vs. time for this form of a pattern is depicted in the uppermost curve of FIG. 10. Advantageously, from the standpoint of symmetry in the control of motion where both directions of travel must be controlled, the absolute limits of rate of change of acceleration can have equal magnitude as can the absolute limits of acceleration and velocity. The curve referred to in Fig. 10 may be integrated and the result can represent a command pattern for an ascending elevator car. A descending elevator car would have an inverted pattern around the origin. The lowermost curve in FIG. 10 corresponds to a plot of rate of change of acceleration or jerk and the next upper curve labeled $E_A$ represents acceleration under the jerk constraints, illustrating a linear rate of increase of acceleration to the maximum, a flatting and then the termination of acceleration at a linear rate to zero as the maximum velocity portion of the motion is approached.

These constraints imposed upon the system can be considered from a mathematical point of view in terms of displacement. Thus it should be recognized that velocity is the first derivative of displacement with respect to time, acceleration is the second derivative of dispalcement with respect to time and rate of change of acceleration or jerk is the third derivative of displacement with respect to time. Accordingly, if the optimum jerk curve, the curve of the third derivative of displacement with respect to time, is integrated, an acceleration curve subject to velocity, acceleration and jerk constraints corresponding to the plot $E_A$ in FIG. 10 will be obtained. An integration of the acceleration curve corresponding to the curve labeled $E_A$ in FIG. 10 produces a velocity curve subject to velocity, acceleration and jerk constraints. A third integration yields a displacement vs. time function with it again meeting the constrains of jerk, acceleration and velocity.

In FIG. 2 a functional block diagram of a position vs. time pattern or command signal generator is illustrated. This system is represented as an acceleration generator 51 which generates a voltage signal corresponding to the signal $E_A$ of FIG. 10 for a full speed run and where maximum velocity is not attained $E_A$ of FIG. 11. The acceleration generator is subject to constraints of jerk imposed upon lead 52, acceleration applied from lead 53, and velocity applied from lead 54. It issues over lead 55 a voltage representing acceleration which is applied to a first integrator 56 to produce a velocity time function of the form shown in the uppermost curve of FIG. 10. This voltage signal is applied over lead 57 to a second integrator 58 which produces the desired position vs. time voltage form on lead 41 as utilized at the summing point 38 shown in FIG. 1.

A detailed schematic diagram of the position vs. time signal generator is set forth in FIG. 9 employing a number of logic symbols in place of the detailed circuit elements. Accordingly, before proceeding with a discussion of this schematic the individual elements corresponding to those logic symbols will be disclosed.

In FIG. 3 a schematic diagram is shown of a circuit which with minor modifications can be utilized as either an "and" represented by the symbol in FIG. 3a or an "or" represented by the symbol in FIG. 3b. When functioning as an "and," the double pole signal throw switch DPST is left in the position shown whereby terminals 61 and 62 function as typical "and" inputs. To condition the system as an "or," the switch DPST is transferred to its second position whereby the terminal 62 is grounded and terminal 63 is placed as a parallel input with terminal 61 to constitute with 61 two typical "or" inputs. The "and" circuit as utilized below is a composite of an "and" controlling a Schmitt trigger made up of the circuit to the right of junction 60 in FIG. 3 and represented in FIG. 3a as a separate rectangle. The Schmitt trigger is not essential to the "or" functions; hence it is frequently restricted to the junction 50 as its output and is so illustrated by the symbol of FIG. 3b.

Each of the "and" and "or" input terminals is connected through a diode 64 and a resistor 65 to a minus 12 volts supply (not shown) as at terminal 66 and in the case of the "and" to a Schmitt trigger through suitable conditioning diodes 67 and 68 to a voltage divider made up of resistors 69 and 71 to the base of transistor Q1. Transistors Q1 and Q2 are the active elements of a Schmitt trigger providing an "on" output lead 72 and an "inverse" or "off" output lead 73 represented for an "and" function in FIG. 3a by the lead extending from the main portion of the square symbol and the lead extending from the cross hatched corner of the main symbol respectively. "On" input and output signals from this circuit are represented by a grounded state while an essentially —12 volt collector bias is an "off" signal. Thus if a ground is absent from any of the "and" inputs, transistor Q1 is conducting and the output lead 73 is effectively at the grounded level to provide an "on" on the inverse output. At this time the voltage divider formed from the minus 12 volt supply terminal 74 through collector resistor 75, resistor 76, the base of Q2 and resistor 77 maintains the base of Q2 essentially at ground and therefore Q2 non-conductive so that the normal output 72 of the "and" circuit is at the collector potential and effectively "off."

When all of the input terminals in the "and" circuit are grounded, transistor Q1 is turned off and the "and" output lead 73 is at the effective collector potential of minus 12 volts less the drop in resistor 75 or the "off" condition. Under these conditions, the base of transistor Q2 is sufficiently negative to place that transistor in its "on" condition so that its collector potential is essentially at ground and output 72 is in the "on" or grounded state.

When set for operation as an "or" circuit with switch DPST closed, a ground imposed on any of "or" inputs 61, 63 or their equivalent transfers junction 50 from the —12 volts applied at terminal 66 to ground thereby offering an "on" output from the "or" to any following logic elements.

FIG. 4 is the schematic diagram of a differential amplifier represented by the logic symbol or FIG. 4a. Plate voltage is applied to the two triodes 81 and 82 from a suitable source connected to the terminal 83, and cathode voltage is applied to both triodes at terminal 84. Each of the two tubes act as a cathode follower driving the cathode of the other tube. The output is derived as a potential across the terminals 85 and 86 and can be established without regard to ground. Inputs represented by the plus and minus signs in the symbol of FIG. 4a are respectively shown to the grids of tubes 81 and 82 from leads 87 and 88. This type of amplifier has a number of advantages including the ability to issue an output voltage either with or without sign reversal referred to the input voltage, and the ability to mix two voltages by taking their difference. As illustrated in the symbol of FIG. 4a, when the output is taken from the lead 86 an inversion will be realized in the signal as applied to the input lead 88 while no inversion occurs when the input is applied at 87.

While differential amplifiers are self stabilizing to a substantial degree, where maximum stabilization is desired, their characteristics can be enhanced by chopper stabilization in the manner depicted in FIG. 5. The logic symbol for a chopper stabilized amplifier is illustrated in FIG. 5a. Chopper stabilization is achieved by connecting an inverting, high gain, carrier modulated amplifier, whose output has been demodulated, between the positive and negative input as represented by the chopper modulated amplifier 91 connected from input terminal 92 to the positive input 93 of the conventional differential amplifier illustrated in FIG. 4. Input 92 is connected to the negative input of the amplifier 94 through condenser 95. Thus only one external input is available to a chopper stabilized amplifier as shown in the logic symbol of FIG. 5a and chopper stabilized output derived on lead 96 is inverted.

FIG. 6 represents a transistor power switch having a symbol utilized in the schematic diagrams as shown in FIG. 6a. The switch comprises a PNP transistor Q3 having an input 101 to its base through the voltage divider provided by series resistor 102 and ground resistor 103. The emitter of the transistor is connected through a diode 104 to ground. The collector is connected through the element to which the switch is applied, in the present application, relay coils, as at terminals 105 and 106 to a terminal 107 connected to a suitable source of collector voltage as a —12 volt supply not shown. A diode 108 is connected across the switch load.

The circuit of FIG. 7 is utilized to provide an output signal as ground representing "on" on its normal output lead 111 and a —12 volt signal representing "off" on its inverse output lead 112 any time a signal other than zero is present on its input lead 114. The absence of a signal on input lead 114 inverts the conduction states placing an "on" or ground signal on lead 112 and an "off" or —12 volt signal on lead 111. The amplifier comprises a section including transistors Q4, Q5, Q6 and Q7 which control a Schmitt trigger including transistors Q8 and Q9 providing the outputs. The circuit will best be understood by a consideration of its operation.

When a positive signal with respect to ground is applied to input 114, transistors Q4 and Q5 are non-conductive. Since there is no drop in the collector resistors 116 and 117 of these transistors, the base of each of transistors Q6 and Q7 are at —12 volts and these transistors are placed in conduction. Since Q7 is conducting, its collector and junction point 118 are essentially at ground. This ground prevents conduction in transistor Q8 since it is below the operating threshold which must be passed through diodes 119 to establish the threshold voltage imposed on the base of transistor Q8. The voltage divider composed of resistances 122, 123 and 124 establishes a negative bias on base Q9 which causes that transistor to be conductive. This effectively grounds collector Q9 since the collector voltage drop occurs in resistance 126, and terminal 111 issues a ground. This neglects the resistance of emitter resistor 121 which is small compared to collector resistor 126. Condenser 125 bypasses the resistor 123 and this "speeds up" the switching action. The collector voltage at the collector of Q8 is reflected in the inverse output 112 as an "off" signal.

Application of a negative voltage with respect to ground at input 114 causes both of transistors Q4 and Q5 to be conductive by reducing the base potential sufficiently to exceed the emitter bias of diode 128 on Q4. This bias is developed in the path from bus 113 to ground afforded by resistor 127 and diode 128. Diodes 132 and 133 provide protection for the base-emitter junctions of Q4 and Q5. With Q4 and Q5 conductive, their collectors are at ground and transistors Q6 and Q7 are non-conductive. Junction 118 floats under these conditions and no signal is available to place transistor Q8 in conduction. Therefore the conditions described for a positive input at 114 prevail in the Schmitt trigger and ground appears at 111 while inverse output 112 is off.

If zero voltage is applied to input 114, it results in conduction in transistor Q5 while transistor Q4 is non-conductive. Under these conditions the voltage drop through emitter resistor 127 and diode 128 is such that emitter Q4 is negative with respect to its base and that therefore the transistor is off, while transistor Q5 has its emitter at ground and its base at a negative voltage due to the connection from bus 113 through resistance 130 and is conductive. This places base Q7 at ground while that of Q6 is at −12 volts. Since transistor Q7 has its emitter biased negatively with respect to ground through the voltage divider provided by resistor 129 and the forward drop of diode 131, Q7 is non-conductive. Q6, however, is conductive and therefore imposes a base voltage on transistor Q8 which is determined by the ratio of the voltage drop in resistors 134 and 135, the forward drop in diodes 119, and the drop in resistor 136. This base voltage is sufficient to place transistor Q8 in conduction whereby the base potential on Q9 is reduced to make Q9 non-conductive. Under these conditions a ground appears on inverse output lead 112 and a −12 volts appears on output 111.

The circuit of FIG. 7 thus monitors the absolute value of an input on 114 if that input is above a threshold level. It is termed an "absolute value" circuit below and has been assigned the symbol in FIG. 7a where the inverse output issues from the corner square with the crossed diagonals.

The buffer amplifier on FIG. 8 is employed in a number of locations in the system diagrams. It includes an input lead 141 and an output lead 142 which issues a ground signal when the input receives a signal which is positive with respect to ground and issues a negative voltage signal signifying an "off" output when the input receives a negative voltage with respect to ground. A positive voltage on 141 is applied through input resistors 143 and 144 to the base of Q10 to insure that that transistor is non-conductive. The emitter of transistor Q10 is connected to ground at bus 145. The emitter-base junction is provided with back voltage protection by the diode 146. The collector of Q10 is supplied with −12 volts at bus 147 through collector resistor 148. With transistor Q10 non-conductive, its collector is essentially at −12 volts and this voltage is applied to the base of transistor Q11 to cause that transistor to enter its conductive state. While conductive, the collector of transistor Q11 is essentially grounded since the preponderance of the collector voltage supplied from lead 147 is dissipated in collector resistor 149. Accordingly, the ground at the collector appears at the output lead 142 as an "on" signal.

Next consider the application of a negative signal at input 141. This signal, when applied to the base of Q10, turns on the transistor to ground its collector thereby grounding the base of transistor Q11. An emitter bias is provided for Q11 through resistor 151 connected to lead 147 and voltage regulating diode 152, whereby the emitter is always maintained somewhat negative with respect to ground. In this condition of bias the transistor is non-conductive. Accordingly, the potential appearing on bus 147 is developed at output lead 142 to signify an "off" or negative output voltage signal.

The circuit is made insensitive to small reductions in positive input voltage at or near the "on" threshold by resistor 153 which requires a reduction of at least 10 percent below the "turn on" voltage to invert the conduction state.

The circuit of FIG. 8 is illustrated in a number of locations as a "buffer amplifier" in the schematic system diagrams and is symbolized as a rectangle labeled BA.

The position-time signal generator as shown schematically in FIG. 9 will now be considered. As indicated in the block diagram of FIG. 2, the first element of the position time signal generator is an acceleration generator. The acceleration generator consists of two basically similar circuits. The first circuit combines the velocity and acceleration constraints. The second circuit imposes the rate of change of acceleration with time constraints.

A pattern is generated when a difference is indicated to the generator between the current position signal of the generator for the object being controlled, in the illustration, an elevator, and the position to which it is desired to transfer the object. In the elevator example, the existence of a call for service at a landing remote from that signal which the generator indicates is the current location of the elevator will produce such a signal. If the initiation or current position of the object as signaled by the command generator can be represented by a voltage $X_i$ and the desired or destination location represented by a voltage $X_{cr}$, those two voltages can be applied through suitable resistors 161 and 162 to the positive and negative input terminals of differential amplifier A1. The amplifier mixes and amplifies the two voltages by taking their difference and issuing it as a signal through resistor 163 to junction 164 from which it is fed through resistor 165 to differential amplifier A2 positive input. The signal from junction point 164 is clamped by the action of diodes 168 and 169 connected thereto with reverse polarities and coupled to respective adjustable voltage sources 154 and 155 of a polarity opposite that of the conductive direction through the diodes and of equal magnitude whereby plus and minus limits on the level of the signal representative of velocity can be imposed at the junction 164. The adjustable voltage sources are shown as batteries connected across potentiometers in the illustration although alternative forms of regulated limiting voltages are available.

The logic of the functions to be described below requires an indication of the existence of a velocity signal without regard to its polarity as derived from an absolute value circuit of the type shown in FIG. 7 represented as AV1 in the drawing. Circuit AV1 issues a signal when either a plus or minus difference exists between the input signals $X_i$ and $X_{cr}$ to amplifier A1. Similarly, a buffer amplifier BA1 corresponding to the amplifier shown in FIG. 8, is connected to the junction point 164 to issue an "on" signal for a plus velocity and an "off" signal for a minus velocity. A positive velocity indicates an "up" command signal while a negative velocity indicates a "down" command signal. The existence of, and the polarity of, a difference of the signals $X_i$ and $X_{cr}$ and the resultant velocity signal are sensed at the junction 164 by these circuits. Further, this signal which represents the velocity to be commanded by the system is limited to a voltage proportional to the plus or the minus maximum velocity limits as set by the voltages applied to the diodes 168 and 169. For purposes of aiding the understanding of the logic circuits of FIGS. 13, 14, 15 and 18 the signals from AV1 have been indicated as $|V|$ indicating an absolute value of V (without regard to sign) and from BA1 as $\pm V$ indicating a plus or minus value of V.

The velocity signal issuing from A2 is amplified in accordance with the gain of amplifier A2 as set by the value of resistors 166 and 167. Signal from A2 is passed through resistor 171, relay contact K2–1 and resistor 172 to the chopper stabilized amplifier A3, from which it is fed back through resistor 173 to the input of differential amplifier A2. Each of amplifiers A2 and A3 have a high gain. The resistors 165 and 173 provide a negative feedback loop with a feedback ratio B equal to $$R_{165}/R_{173}+R_{165}$$

If the signal issuing from the output of amplifier A3 is designated $E_v$, and the signal at the junction 174 between resistors 171 and 172 is designated $E_0$, it can be shown that $E_v$ is related to the velocity voltage V by the relationship $$E_v = \frac{-R_{173}V}{R_{165}}$$

If $R_{173}$ equals $R_{165}$, then $E_v$ equals −V for D.C. values of V. In the plots of $E_v$ in FIGS. 10 and 11 the curve has been inverted.

As at the junction 164, the signal $E_0$ at junction 174 is clamped by a pair of diodes 175 and 176 connected as in the case of diodes 168 and 169 to respective reverse poled adjustable voltage sources 156 and 157 to define voltages minus $a$ and plus $a$ characteristic of the plus and minus acceleration limits. In addition an absolute value circuit AV2 is coupled at junction 174 to provide an output indicative of the presence of an acceleration component in the pattern being generated and the inverse of the presence of an acceleration component. An acceleration component issues a ground on lead $|a|$ and no component issues a ground on lead $|\bar{a}|$. Thus the ability of the pattern generator when a step input is applied to follow the step input is limited by the clamping action of the diodes to plus or minus the magnitude of the voltage setting $a$. The capacitor 177 connected between the output and input of amplifier A3 provides an integrating function in cooperation with resistor 172 so that for a high gain amplifier A3 having a gain of from $10^4$ to $10^6$, $$E_v = \frac{-1}{R_{172}C_{177}} \int E_0 dt$$

For constant values of $E_0$, $$E_v(t) = \frac{-E_0 t}{RE_{172}C_{177}} + E_v$$

$t=0$.

When an input such as V is applied as a step, the feedback action of $R_{173}$, $R_{165}$ and amplifier A2 try to supply the signal $E_0$ required to make $E_v$ step accordingly. Because of the diodes 175 and 176, $E_0$ cannot reach the value required for a rapid step of $E_v$. Consequently $E_v$ approaches the new value of V at a linear rate dictated by $$\frac{E_0 t}{R_{172}C_{177}} + E_v$$

$t=0$.

Since $E_0$ is limited to plus or minus $a$, the expression of $E_v$ becomes $$E_v(t) = \frac{at}{R_{172}C_{177}} + E_v$$

$t=0$.

$E_0$ and therefore $a$ will persist until $E_v = V$ at which time $E_0$ becomes zero.

Plots of the various signals experienced in the circuit of FIG. 9 are shown in FIG. 10 for a displacement of a sufficient magnitude to enable the moving object to attain its maximum rated speed. Thus the signal issuing from amplifier A6 as a result of the combining of the input signals $X_i$ and $X_{cr}$, as limited by the diodes 168 and 169, is depicted as V on the curve. This signal when applied to the amplifier A2 produces a signal $E_0$ at junction 174 as shown in the plot wherein $E_0$ has a finite value during the period of acceleration and deceleration. Further the voltage $E_v$ as it issues from the chopper stabilized amplifier A3 appears as shown in FIG. 10 as an acceleration limited velocity curve with infinite rate of change of acceleration or jerk at the initiation of the curve, $t_0$, at the breakover to maximum value $t_2$ and on deceleraton at the breakover from maximum value at $t_4$ until a zero velocity is approached at $t_6$. It should be noted that in the curve $E_v$ would be negative going due to the inversion in the amplifier and is drawn as shown only for clarity in illustration. If jerk limiting were not required, integration of the voltage $E_v$ would yield a position-time pattern containing limited velocity and acceleration and unlimited jerk.

After $E_v$ equals V has been reached and $E_0$ equals zero, a step of the input V to zero results in the previous cycle being repeated but with $E_0$ being clamped to the acceleration limit "$a$" of the opposite sign through one of the diodes 175 and 176. This deceleration cycle occurring between intervals times $t_4$ and $t_6$ appears as a negative $E_0$ of magnitude minus $a$ on the pot of FIG. 10.

The area under the $E_0$ vs. time curves is directly related to the top speed commanded, that is $E_v$ and V. Also, if the initial and final values of $E_v$ equal zero, the area of acceleration equals the area of deceleration with appropriate correction of the sign of the areas.

In order to meet the constraint of a selected finite value for the rate of change of acceleration, the acceleration vs. time plot must appear as shown at $E_A$ in FIG. 10. That is, it must have an initial and a final slope to its maximum rate of acceleration defined by the magnitude of $E_0$ in order that an object moving in response to the signal will be gradually brought up to the acceleration level dictated, and gradually transferred from the acceleration to a constant velocity. In order that the commanded top speed of the signal be maintained, the area under the newly formed curve should be the same as that under the original $E_0$. This can be observed by inspection of $E_0$ and $E_A$ on FIG. 10 inasmuch as the curves are of equal area.

The jerk limited acceleration pattern is attained using the same type of circuitry as used to obtain the acceleration limited velocity voltage $E_v$. Thus $E_0$ is passed from junction point 174 through normally closed relay contact RF-1, input resistor 178 into chopper stabilized amplifier A4 having a gain adjusting resistor 179 connected between its output and its input. The output of amplifier A4 is also connected through resistor 181 to the input of an inverter differential amplifier A5 also having a gain adjustment resistor 182 connected from its output to its input. From the output of A5 the signal is passed through resistor 183 to junction point 184.

The signal follows a number of paths from the junction 184 including that through resistor 185 to amplifier A6 functioning as an integrator by virtue of capacitance 186 connected between its output and its input and also supplying through feedback resistor 187 an input to the amplifier A4 whereby the circuit between A4 and A6 has characteristics similar to those of the circuit between A2 and A3. Jerk limiting of the signal is achieved at junction point 184 by means of diodes 188 and 189 connected to adjustable sources 158 and 159 of negative and positive D.C. voltage whereby the signal limits representing the rate of change of acceleration with time or jerk as symbolized by $b$ can be imposed upon the system in an adjustable manner by the appropriate setting of the potentiometers. The interval of the change in the acceleration, i.e. the interval during which jerk is present, is also monitored at the junction point 184 by absolute value circuit AV3 having a normal ouput $|b|$ indicating the existence of jerk and an inverse output $|\bar{b}|$ indicating the absence of jerk, each of these outputs being effective to issue a ground signal in the "on" condition and a negative voltage signal in the "off" condition.

Referring to the curves of FIG. 10 the signal at the output of amplifier A6 is shown as curve $E_A$. It is this signal that is fed back negatively to the input of amplifier A4 and represents a jerk limited acceleration pattern which can be independently adjusted by varying the clamping voltages $\underline{a}$ for acceleration, $\underline{b}$ for jerk and V for velocity at junction points 174, 184 and 164 respectively. The wave form at the junction point 184 with jerk limiting imposed is shown on the plot $E_j$ of FIG. 10.

Two integrations of the jerk limited acceleration pattern $E_A$ yields a position time pattern voltage meeting all requirements of jerk, acceleration and velocity limiting. As developed in the present circuits, these limits are independently adjustable by varying their clamping voltages $\underline{a}$, $\underline{b}$ and $\underline{V}$.

The signal $E_A$ issuing from amplifier A6 as presented in FIG. 10 has been inverted for clarity in relating it to acceleration. Thus that area on the positive side of the origin is in the circuit negative and that on the negative side is positive. That signal is applied to an integrator comprising resistor 191, a chopper stabilized amplifier A7 and capacitance 192 to produce a signal having the form of a velocity command vs. time at terminal 193. This signal has been designated as $\dot{X}_p$, as the first derivative of displacement, and it has the wave form corresponding to the velocity vs. time plot of FIG. 10 in all but the final interval extending from time $t_6$ to time $t_f$. This termination of the velocity pattern at this time is due to the operation of relay RF to close contact RF-3 as will be discussed below. The effective amplification level of integrator A7 may be adjustable where it is required to relate or scale the signal values derived therefrom with the feedback values obtained from the driving system for the object being controlled. In the case of an elevator utilizing a position feedback signal as derived from potentiometer 36, the magnitudes of $\dot{X}_p$ can be adjusted at integrator A7 to provide the proper relationship.

The second integration of the signal $E_A$ is accomplished in the integrator connected through normally closed relay contact RF-4 and comprising resistor 195 to the input of chopper stabilized amplifier A8 having its output connected to its input through the capacitance 196. The output of this integrator as it appears at terminal 197 is a plot of position vs. time at suitable voltage levels obtained through the adjustment of the gain of integrator A8 (by means not shown) to match the position voltages derived from the feedback loop of the driven device. This position vs. time signal has been inverted by the amplifier function and is represented at terminal 197 as minus $X_p$.

The present system contemplates accuracies in the control of a moving body of the order of .1 of an inch in a total travel of the car. While as shown above the integration of jerk, acceleration and velocity can be programmed to generate the required position vs. time command signal where these levels of accuracy are required it cannot however be expected to be errorless. In order to overcome these errors, even if they be about two or three inches over the proposed range of travel, the command signal can be based from the destination position rather than from the initiation position provided a transfer to this new base is accomplished without discontinuities in the command signal. As will be shown below, excellent results can be obtained by transferring the command signal from the control which generated the pattern from the initiation of travel to a control generating a pattern from the destination or final value at a moment when the ratio of the velocity to the distance from the destination has attained a selected value. In the development which follows, it will be shown that this transfer can be effected without ambiguity when the ratio of the pattern velocity to the pattern distance to go to the destination is in the relationship of $a/3b$ where $a$ is the maximum acceleration and $b$ is the maximum jerk or rate of change of acceleration. As viewed on FIG. 10, this transition occurs at the moment $t_6$ on the velocity vs. time plot.

The transition of the pattern base from initiation to destination is accomplished by contacts of relay RF when that relay is energized. Energization of the relay is accomplished through a logic circuitry responding to the command or pattern velocity signal $\dot{X}_p$ and the command or pattern position signal $X_p$ as compared to the signal $X_{cr}$ representative of the location of the destination of the moving body. The computed or pattern position represented by the voltage minus $X_p$ at terminal 197 is compared with the voltage $X_{cr}$ at terminal 198 representative of the location of the destination or "call request" of the moving body in amplifier A9. The relative values of the voltages monitored in this and the associated circuits necessary to provide the proper ratio as noted above is adjusted by resistances 199 and 201 and voltage divider 202. The summing which occurs by this combination produces a signal which is representative of the distance between the generated pattern position and the actual destination position. This difference signal is compared with the generated pattern velocity $\dot{X}_p$ in amplifier A10. In order to properly relate these signals and maintain the requisite ratios, the gain of amplifier of A9 is adjusted by means of feedback resistor 203 and voltage divider 204.

Signal $X_p$ is fed to amplifier A10 through resistance 205 and the pattern distance-to-go is fed to A10 through resistance 206. When the two signal values are equal and therefore the ratio specified above is satisfied, absolute value circuit AV4 receives a zero input signal and therefore issues an "on" signal on its inverse output lead 207 to "or" 208, which issues a signal to "and" 209 over input 211. Signal ST provides a ground to lead 212 when a run is in progress and following the completion of a run until the next run start signal is applied to the pattern. For example the signal ST can be employed as an indication of the proper condition of safeties and interlocks of the system such that it must drop prior to a start and should reappear prior to the time the final portion of a stopping sequence is entered upon by the pattern command. Upon coincidence of a start signal ST applied at terminal 212 as a ground, indicating that the system has a signal to run and is in the process of responding to that signal, "and" 209 issues an "on" signal to Schmitt trigger 210 over its output lead 213. The trigger 210 seals the circuit by applying its output signal over lead 214 to the input or "or" 208 whereby "and" 209 is sustained as long as the ST signal is maintained on 212. The inverse output of trigger 210 is applied over lead 215 to power switch PS1 which again inverts the signal providing a ground so that relay RF pulls in. Relay RF is supplied with −12 volts D.C. at terminal 216 and is pulled in whenever the circuit is completed through its coil to ground.

Figure 13:
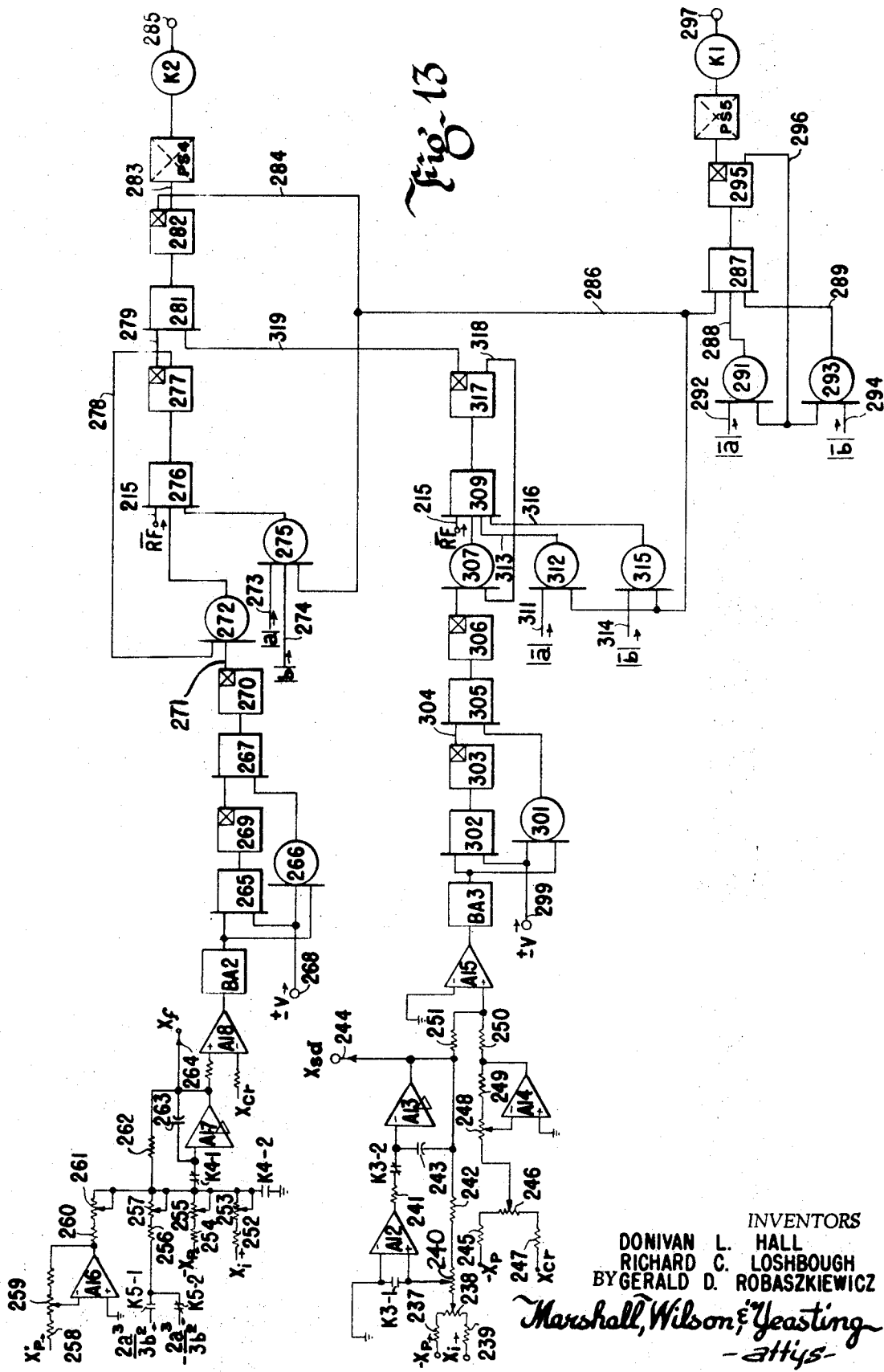
FIG. 13 is a schematic diagram of the stopping distance computer of FIG. 12.

The functions of relay RF when energized are best considered with respect to the terminal portions of the stopping sequence and therefore will not be considered until the stopping distance computer shown in block diagram in FIG. 12 and in schematic form in FIG. 13 is considered. As illustrated in FIG. 12, the signal initiating slowdown is derived from two channels, one representative of a stop signal effective during the period the pattern signal is accelerating and the other a stop signal effective during the interval the pattern is generating the maximum velocity. In the case of slowdown from acceleration, a supplemental computer continuously predicts the then current stopping position as the velocity and displacement patterns are generated and compares this predicted stopping position with a signal corresponding to the destination position so that when the two match the stop signal is issued. In the case of a maximum velocity run, since the constraints imposed upon the pattern are symmetrical with respect to rate of change of acceleration and acceleration, the transition either from zero to maximum velocity or from maximum velocity to zero consume substantially identical periods of time and involve identical distances of travel. Accordingly, a measurement of the distance between zero and maximum velocity is made during the acceleration interval to maximum velocity and is stored and the pattern distance remaining to be traveled to the destination is continuously generated and compared with the distance to make the transition between zero and maximum velocity so that when the two match, the stop signal is initiated.

A stopping condition can be established from a third state in the pattern computer, that during the change of acceleration as the pattern transfers from a constant acceleration to a constant velocity condition. However, the stopping distances established during this transition are the same as those for the value of final stopping position computed at the termination of the interval in which constant acceleration is maintained inasmuch as the pattern, subject to the jerk constraint, will necessarily follow a decreasing acceleration to zero velocity and a continuation to a constant negative acceleration value in accordance with that computation. Accordingly, if a stop signal is accepted during the transition between maximum acceleration and maximum velocity the last value of final stopping position is employed to control the pattern and that position signal is stored for utilization if required during this interval.

It is evident from the above consideration of the position time pattern generator that the only input parameter that is an independent variable is the velocity signal V. The functions $E_0 \cdot t$, $E_v \cdot t$ and $E_A$ all vary so as to satisfy the velocity command subject to the acceleration and rate of change of acceleration limits $a$ and $b$. Thus the key to landing the position pattern at a particular destination is to turn off the V signal at the proper time in advance of the arrival of the position voltage at the destination. In other words, stopping distance for the pattern must be determined and utilized to signal slowdown of the pattern. Slowdown from top speed is initiated by turning off the input to amplifier A2, the signal V.

An appreciation of a slow down from maximum velocity can best be gained with reference to the velocity plot of FIG. 10. The distance traveled to accelerate from zero velocity to maximum velocity is traversed in the interval from $t_0$ to $t_3$, and that distance is equal to the distance required to stop from top speed during the interval between $t_4$ and $t_f$ provided the velocity curve is limited by the rate of change of acceleration and acceleration of equal magnitudes on acceleration and deceleration.

The coincidence of a velocity signal, V, with no acceleration $|\bar{a}|$ or rate of change of acceleration signal $|\bar{b}|$ indicates maximum velocity. This concidence results in the operation of relay K3 as shown in FIG. 14. "And" circuit 217 receives a ground indicating a velocity signal $|\bar{V}|$ on lead 218 from the output of absolute value circuit AV1 in FIG. 9. It receives a ground indicating the absence of an acceleration signal $|\bar{a}|$ on lead 219 from the inverse output of absolute value circuit AV2 in FIG. 9 and it receives a ground indicating the absence of a rate of change of acceleration signal $|\bar{b}|$ on lead 221 as derived from the inverse output of absolute value circuit AV3 in FIG. 9. Upon the coincidence of these three grounded inputs, "and" 217 issues a ground on lead 222 to the Schmitt trigger 223 which passes the ground on lead 224 to "or" 225. "Or" 225 thus provides a ground to one of the inputs 226 of "and" 227. If there is an inverse output from Schmitt trigger 210 so that lead 215 in FIG. 9 is grounded, that ground is applied to "and" 227 and the coincidence of grounds in all inputs causes the circuit to issue a ground to Schmitt trigger 228. The amplifier seals the circuit through its normal output on lead 229 which provides an input to "or" 225. Thus until the inverse output of trigger 210 is turned off at the end of the constant deceleration interval of the pattern, this circuit remains active. The inverse output of trigger 228 is applied to power switch PS2. Since that output is "off," the inversion in PS2 provides a ground to the relay coil K3 so that the minus 12 volt source (not shown) connected to terminal 230 pulls the relay. K3 thus, upon being pulled, marks the end of the acceleration of the pattern to maximum velocity.

In the generation of a stopping pattern, it is necessary to connect a source of voltage which is constant for any given settings of acceleration $\underline{a}$ and jerk $\underline{b}$ and which is negative for a pattern command for one direction of travel, up in the elevator illustrations, and positive for the other direction. Relay K5 of FIG. 9 controls the connection of this voltage by sensing the sign of the signal V from buffer amplifier BA1. A positive value of V issues an "on" or ground from BA1 to power switch PS3 to turn power switch PS3 off and prevent energization of relay K5. A negative value of V turns BA1 "off" to turn PS3 "on" whereby a ground is supplied to K5. This completes an energizing circuit for K5 from a source of voltage at −12 volts D.C. (not shown) connected to terminal 236 to pull the relay.

The command position from which the signal pattern originates on a given run is indicated by the position pattern generator as a voltage $X_i$. This voltage is developed and stored for the interval of the run in chopper stabilized amplifier A11 of FIG. 9. The signal $-X_p$ generated while the pattern command is stationary represents the effective position of the command developed during the preceding run. That signal is applied to amplifier A11 through resistance 231, potentiometer 232 and contact RF–7 to the input and is fed back through resistance 233. As long as the pattern commands a stationary signal, relay RF remains energized. When signal ST at terminal 212 is turned "off" to initiate a new command signal generation and relay RF is dropped by the disabling of "and" 209 amplifier A11 becomes a storage for the inverted negative position signal $-X_p$ as signal $X_i$ appearing at terminal 234. Capacitance 235 connected between the output and input of A11 causes this storage function in the amplifier. Dropped relay RF disconnects the feedback resistance 233 and the input from $-X_p$ at now open contact RF–7 and the signal from rheostat 232 is applied to ground through back contacts RF–8. The circuit of FIG. 13 represented by differential amplifiers A12 and A13 performs the function of measuring the signal representing the distance traveled by the position pattern during the interval up to time "$t_3$." At this time, the operation of the relay K3 converts the chopper stabilized amplifier A13 to an analog memory whose output voltage represents the stopping distance from top speed. The degree of stabilization of amplifier A13 is sufficient that the stopping distance voltage can be held in memory within ten millivolts of its initial value for as long as one minute. A negative value of position signal $-X_p$ derived from terminal 197 of FIG. 9 is applied through resistor 237 to the summing point on potentiometer 238, while the signal corresponding to the point of initiation of pattern travel $X_i$ is applied through resistance 239 to that summing point. At the summing point the signal represents the difference between the initial and current position generated signals and thus the distance the pattern command has traversed at any instant during its generation. This signal is applied through potentiometer 240 to the positive input of amplifier A12 and from that amplifier through resistance 241 and normally closed contact K3–2 to the input of the chopper stabilized amplifier A13. Appropriate gain of this combination is set by means of the feedback resistor 242 and the storage function of A13 is facilitated by capacitance 243. When relay K3 operates, it closes contact K3–1 to ground any further signal representative of displacement command generated by the pattern and opens normally closed contact K3–2 to separate the output of amplifier A12 from the input to the storage provided by amplifier A13 whereby A13 maintains the displacement signal level current at the time of the relay operation. Thus A13 provides a means for storing the pattern distance signal for the transition between zero and maximum velocity, $X_{sd}$, and makes this signal available at terminal 244.

Another subtracting circuit providing a signal representative of the pattern distance remaining to be traversed by the pattern command is provided through amplifier A14. A negative signal of generated pattern position, $-X_p$, is applied through resistance 245 to the summing potentiometer 246 while a signal representative of the location of the destination $X_{cr}$ is applied through resistor 247 to potentiometer 246. The signal derived from this potentiometer is thus the difference between the pattern signal and the destination signal or the signal representative of the distance remaining to be traversed. This signal is applied through potentiometer 248 to the negative input of amplifier A14; the gain is determined by negative feedback through resistance 249. The output of amplifier of A14 and that of storage amplifier A13 are combined through resistances 250 and 251 respectively and applied to the positive input of differential amplifier A15 from which a signal is applied to buffer amplifier BA2. When the distance to go signal ($X_{cr}-X_p$) is equal to the pattern distance between zero and maximum velocity, $X_{sd}$, relay K1 is operated and turns the input to amplifier A2 of FIG. 9 "off" thereby initiating the slowdown of the pattern. The digital logic operating K1 will be discussed later.

Figure 11:
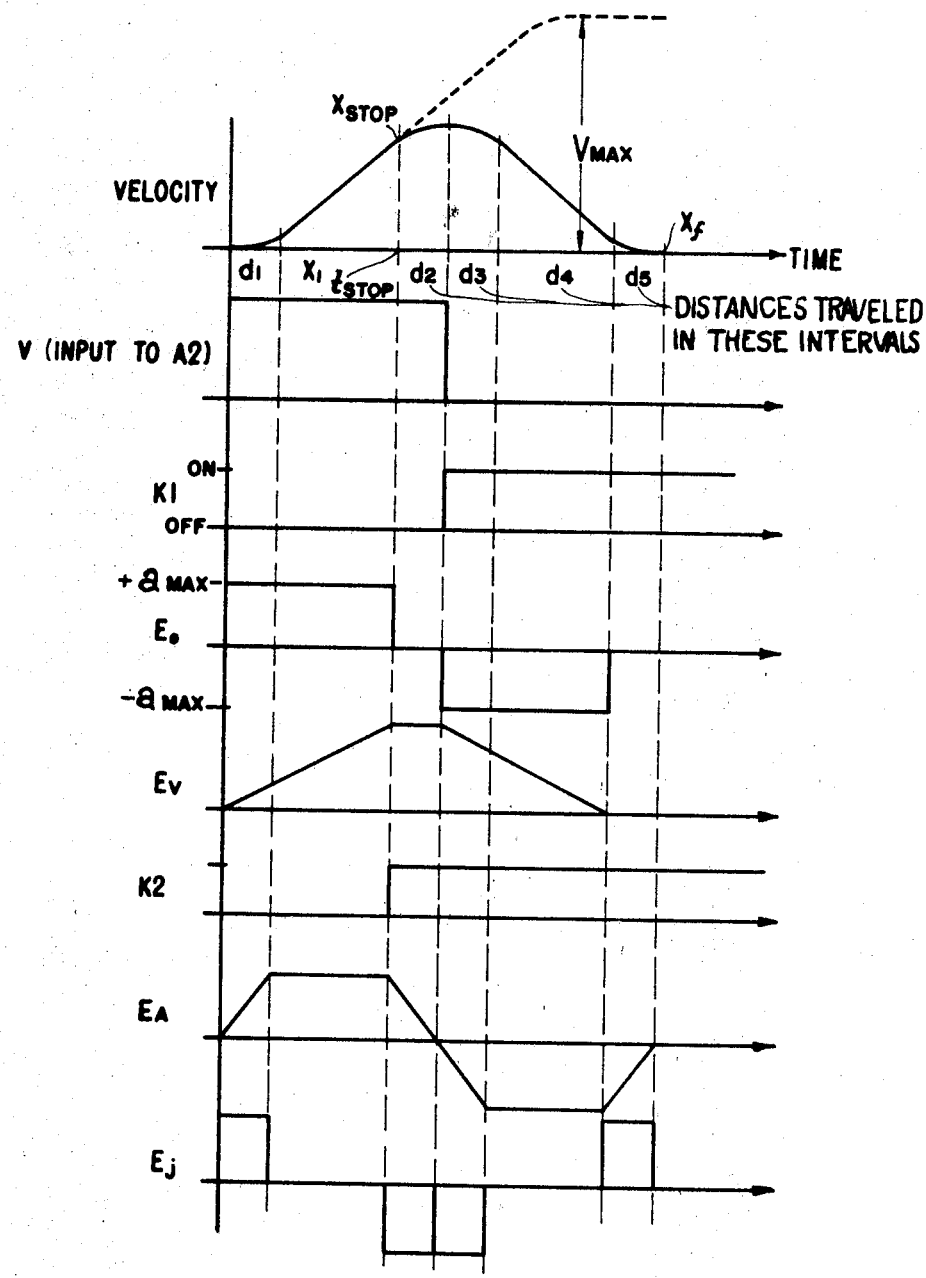
FIG. 11 is a series of curves corresponding to those of FIG. 10 for a short run where full speed is not reached.

The curves of the various functions against time for a stop initiated during the acceleration portion of a pattern generation cycle are shown in FIG. 11. Where such a short run is involved and the maximum velocity is not achieved, separate analog logic is required to ascertain the point at which the initiation of the stopping sequence should be instituted. Analyzing the velocity curve at the top of FIG. 11, distance $d_1$ is the distance the car travels while building up to maximum acceleration $a$. The elapsed time during this interval is determined by the value of acceleration and the rate at which it can increase or $b$. Thus the time required to achieve the maximum acceleration $T_A$ equals $a/b$ where $a$ is in feet per second$^2$ and $b$ is in feet per second$^3$ so that the net quantity is in seconds. For fixed values of $a$ and $b$ this distance is independent of maximum velocity and its value is determined as follows: Since $a$ equals $bt$ and $$V = \int a\, dt \quad V = \frac{bt^2}{2} + C_1$$

At the beginning of the pattern $C_1$ equals zero for V equal to zero at $t$ equal to zero.

$$X_{disp} = \int_0^{T_A} V\, dt = \frac{bt^3}{6}\bigg|_0^{T_A}$$

$$X_{disp} = \frac{bT_A^3}{6} = \frac{a^3}{6b^2}$$

Referring again to the velocity curve, the distance $d_1$ is equal to the distance $d_5$. The distance traveled $X_1$ is variable and determined by the stopping distance required to stop at $X_f$. Thus $X_1$ will vary depending on the length of the short run. $X_1$ is equal to $d_4$. Inspection of the curve also reveals that the distance $d_2$ in the transition from maximum acceleration to zero acceleration is equal to the distance $d_3$ in the transition from zero acceleration to maximum deceleration. These transitions are made at a rate determined by the maximum rate of change of acceleration limited by the pattern generating circuit as described. The value of $d_2$ is dependent on the velocity V at the point $X_{stop}$. Integration of the velocity curve represents the displacement over any interval. The time required to make the transition from maximum acceleration to zero acceleration during the interval $d_2$, from $X_{stop}$ to the point where the acceleration has diminished to zero, is also equal to $T_A$ or $a/b$ and the distance traveled during that interval is the area under the curve within that interval. In this instance the rate of change of acceleration is negative. Accordingly, $$a(t) = -bt + C_1$$

Since $a$ equals $a_{max}$ at $t_{stop}$ or the beginning of this interval, $C_1$ equals $a_{max}$ equals $a_{stop}$ or $a_0$.

$$A(t) = -bt + a_0$$

$$V = \int a\, dt = \frac{-bt^2}{2} + a_0 t + C_2$$

at time $t=0$, $$V = V_{stop}, \quad C_2 = V_{stop}$$

$$V = \frac{-bt^2}{2} + a_0 t + V_{stop}$$

$$X_{disp} = \int_0^{T_A} V\, dt$$

$$X_{disp} = \frac{-bt^3}{6} + \frac{a_0 t^2}{2} + V_{stop} t \bigg|_0^{T_A}$$

$$d_2 = \frac{a_0 T_A^2}{2} - \frac{b_0 T_A^3}{6} + V_0 T_A$$

From FIG. 11 it will be seen that $d_1$ plus $X_1$ is equal to the distance traveled from the time of initiation of the run to the start of the stop and can be denoted $X_{stop}$. Since $d_2$ calculated above equals $d_3$ and $d_4$ plus $d_5$ equals $d_1$ plus $X_1$ the total distance $X_T$ of the run is $$X_T = X_{stop} + d_2 + d_3 + X_{stop}$$

Since $X_{stop}$ is equal to the distance commanded from initiation, it is equal to the position of the pattern at the instant that the stop signal is supplied $X_{(t)}$ minus the initial starting position $X_i$. Therefore $$X_{stop} = X_{(t)} - X_i$$

Also the final position $X_f$ is equal to $X_i$ plus $X_T$. Putting these two equalities into the $X_T$. Putting these two equalities into the $X_T$ equation gives $$X_f - X_i = 2[(X_{stop}) + (d_2)]$$

$$X_f - X_i = 2\left[(X_{(t)} - X_i) + \left(\frac{a_0 T_A^2}{2} - \frac{b_0 T_A^3}{6} + V_0 T_A\right)\right]$$

solving for $X_f$ $$X_f = 2X_{(t)} - X_i + a_0 T_A^2 - \frac{b_0 T_A^3}{3} + 2V_0 T_A$$

The quantity $$a_0 T_A^2 - \frac{b_0 T_A^3}{3}$$

is a constant and dependent only upon the values of acceleration and rate of change of acceleration limits imposed on the pattern generator. Further, if $a/b$ is substituted for $T_A$, these quantities can be represented by $$\frac{a^3}{b^2} - \frac{a^2}{3b^2} = \frac{2a^3}{3b^2}$$

The sign of these constants is reversed with direction reversing so that for a descending elevator they are equal to minus $2a^3/3b^2$.

Thus, knowing the position departed from, the instantaneous position, the instantaneous velocity and the value of the rate of change of acceleration and acceleration limits, the final landing position can be predicted. Further this equation predicts the final stopping position commanded by the pattern at any instant along the acceleration curve if a stop were to be initiated at that instant by monitoring the instantaneous values of velocity and position. The circuit of FIG. 13 provides this monitoring function through the cooperative action of amplifiers A16 and A17 and, as in the case of amplifier A13, amplifier A17 can be transferred to a storage of a final stopping position by opening its input circuit by contact K4–1 while an alternate route for that circuit is passed to ground through contact K4–2.

A summing network to amplifier A17 supplies the components of signal $X_f$ representing the computed final position which will be commanded by the pattern generator in response to a stop signal imposed at any moment. Five inputs are available to this summing circuit. The initial position signal $X_i$ as derived from terminal 234 of FIG. 9 is applied to the circuit through resistor 252 and adjustable rheostat 253. The negative of the instantaneous position signal $-X_p$ from terminal 197 of FIG. 9 is applied through resistor 254 and rheostat 255 proportioned in a two to one ratio to the input for $X_i$. In order to maintain the values representing the distances $d_2$ and $d_3$ including the quantity $(2a^3/3b^2)$ from the above equation or the negative of that quantity, a voltage so proportioned in the chosen scale, is applied through contacts K5–1 and K5–2 respectively to resistor 256 and rheostat 257. The product of velocity and the ratio of the acceleration limit to the rate of change of acceleration limit $a/b$, equal to the quantity $V_0 T_A$ of the equation, is applied through amplifier A16 having a gain equal to $a/b$ and an input at resistor 258 of the first integration of acceleration or velocity indicated as $\dot{X}_p$ derived from terminal 193 of FIG. 9. This signal is applied through voltage divider 259 to the negative input of amplifier A16 to accomplish the requisite multiplication and then applied to the summing network through the resistor 260 and potentiometer 261. Relay K5 is a direction establishing relay and in an elevator system is de-energized when the elevator is set to travel upward. Thus, the negative quantity $-2a^3/3b^2$ is applied to the summing circuit in conjunction with a negative $X_p$ and a positive product of $V_0$ and the quantity $a/b$ developed from the negative input to the amplifier A16 and the inversion accomplished by that amplifier. Resistor 262 from the output of amplifier A17 provides matching to the summing network. Condenser 263 provides memory of the computed stop signal when normally closed contact K4–1 is opened. The instantaneous final position signal generated from A17 output is available at terminal 264 and is identified as $X_f$. This output is combined with a position signal for a call requested $X_{cr}$ when such a signal is made available to the system.

When employed to generate command signals for an elevator according to the example, the higher positions either actual or commanded are represented by the more positive voltages. Thus the stop computation employs a logic which accommodates both direction of car travel by sensing up travel as a positive velocity voltage V, a destination signal $X_{cr}$ for a landing above as more positive voltage than an initiation signal $X_i$ for a landing at a lower location so that the computed final position signal $X_f$ increases as the position commanding ascends, and a position command signal $X_p$ increases in voltage (negatively as utilized in the example) as the commanded position is advanced upward. Conversely, for down travel V is a negative voltage, $X_{cr}$ is less positive than $X_i$, $X_f$ decreases as the descent command is advanced downward, and $X_p$ decreases. These relationships are monitored in the stop command logic and in the call acceptance logic to be described so that for a positive velocity signal V the threshold of the stopping operation and call acceptance occurs while the ascending pattern command is accelerating when $X_f$ has increased to the value of $X_{cr}$, and while the ascending pattern command is at maximum velocity when the increasing position command $X_p$ has approached the value of the destination signal $X_{cr}$ to within the value of the slowdown displacement $X_{sd}$. For a descending pattern, indicated by a negative value of velocity signal V, these thresholds occur for a pattern command in the accelerating mode when the decreasing $X_f$ has diminished to the value of $X_{cr}$, and for a pattern command in the maximum velocity mode when the decreasing $X_p$ approaches the smaller destination signal $X_{cr}$ to within the value of $X_{sd}$.

In amplifier A18 $X_f$ is applied to the positive terminal of A18 while $X_{cr}$ is applied to the negative terminal. Thus until the instantaneous calculated final position $X_f$ equals or exceeds $X_{cr}$, the output of amplifier of A18 is negative into buffer amplifier BA2 so that that amplifier issues an "off" signal into "and" circuit 265. When $X_f$ exceeds $X_{cr}$, the output from A18 will be inverted from a negative to a positive signal. For an ascending command signal, the transition from $X_f$ less than $X_{cr}$ to $X_f$ equal to or greater than $X_{cr}$ marks the point at which slowdown is initiated and hence a transition of amplifier A18 output from negative to positive provides this indication. A descending command signal is marked for slowdown upon the transition of $X_f$ greater than $X_{cr}$ to $X_f$ equal to or less than $X_{cr}$ and thus the amplifier A18 output transfers from a positive value to a negative value to provide this indication.

Buffer amplifier BA2 has the characteristic of issuing a ground or "on" signal to the following logic in response to a positive input and a negative signal or "off" in response to a negative input. Accordingly, the transition to a positive signal turns the output of BA2 on. This output turns "or" 266 on and satisfies one of the conditions which is a prerequisite to turning "and" 267 on. So long as the velocity signal developed in amplifier A1 of FIG. 9 is positive, indicating an ascending command signal, buffer amplifier BA1 will issue an "on" signal to the input at terminal 268 and the coincidence of these conditions turns "and" 265 "on" to provide an "on" output to Schmitt trigger 269 thereby causing it to issue an "off" output on its inverse output. This causes "and" 267 to issue an "off" output to Schmitt trigger 270 whereby its inverse output 271 issues an "on" signal to "or" 272.

"Or" 272 is "on" when the pattern generator commands an ascent and $X_f$ increases to equal or exceed $X_{cr}$ and when the pattern generator commands a descent and $X_f$ decreases to equal or less than $X_{cr}$. It is "off" when an ascent is commanded and $X_{cr}$ exceeds $X_f$ and when a descent is commanded and $X_f$ exceeds $X_{cr}$. Thus for an ascent, with an "on" signal at 268, "or" 266 will be "on" and if $X_f$ is less than $X_{cr}$ "and" 265 will be "off" so that "and" 267 will be "on" and "or" 272 will be "off." For a descent, with an "off" signal at 268, "and" 265 will be "off," if $X_f$ exceeds $X_{cr}$, as it will until a descending pattern advances downward to the stop initiation point, "or" 266 will be "on," "and" 267 will be "on" and "or" 272 will be "off." However, if $X_{cr}$ exceeds $X_f$ during a descent, "or" 266 will be "off," "and" 267 will be "off" and "or" 272 will be "on." It follows that a prerequisite to initiating a stop sequence of the commanded pattern is that "or" 272 be "on."

The match of $X_f$ and $X_{cr}$ to initiate stopping is utilized in the acceleration mode. Thus the pattern must be set for a run as indicated by the drop of relay RF and must either be subject to the acceleration constraint $a$ or the jerk constraint $b$. A coincidence of these conditions is sensed in "and" 276. If the pattern is not set for a run, RF will be pulled or if it is at maximum velocity, no acceleration or jerk constraints are imposed and "and" 276 will be "off." With "or" 272 issuing an "on" signal, with an inverse RF signal derived from terminal 215 of FIG. 9 while a run is in progress, and with either acceleration imposed from absolute value circuit AV2 at lead 273 or rate of change of acceleration imposed at absolute value circuit AV3 on lead 274, "or" 275 will issue an "on" output to "and" 276. The coincidence of "on" signals on each of the inputs causes an "on" output to be issued to Schmitt trigger 277 which in turn imposes an "on" input over lead 278 to "or" 272 thereby sealing the acceleration stop comparison circuit. The inverse output 279 of trigger 277 is applied to "and" 281. Since that output is "off," "and" 281 is disabled and issues an "off" output to Schmitt trigger 282. Schmitt trigger 282 seals the "or" 275 by issuing an "on" signal from its inverse output over lead 284 whereby the termination of acceleration $a$ and rate of change of acceleration $b$ to the input of "or" 275 has no effect. Normal output of Schmitt trigger 282 is applied to power switch PS4 and through the inversion occurring in the switch provides a ground for relay K2 having its opposite actuating coil terminal 285 connected to a source of −12 volts (not shown), whereby relay K2 pulls-in. This initiates the stop sequence by barring the output of A2 from amplifier A3 in FIG. 9 through the opening of normally closed contact K2–1 and the grounding of the input to that amplifier through the closing of contact K2–2 to bring signal $E_0$ to zero value.

Relay K1 operates when the acceleration has reached zero and just prior to the initiation of a negative rate of change of acceleration. This is shown in the third plot of FIG. 11. K1 functions to initiate the deceleration of the pattern as indicated by the negative going $E_0$ signal synchronous with the operation of relay K1. Relay K1 is enabled by the Schmitt trigger 282 when in its "off" state through a ground passed from its inverse output over lead 284 to lead 286 and "and" 287. Inputs 288 and 289 also pass grounds to "and" 287 thereby turning it on when "or" 291 receives a ground on lead 292 from the inverse output of absolute value circuit AV2 indicating that there is no acceleration component in the signal from the pattern generator of FIG. 9 and when "or" 293 receives a ground on input lead 294 from the inverse output of absolute value circuit AV3 indicating an absence of a rate of change of acceleration signal in the pattern generator. Thus when the slowdown process instituted during an acceleration has proceeded to the point where the acceleration is zero, "and" 287 issues an "on" output to Schmitt trigger 295 which seals "ors" 291 and 293 feeding "and" 287 by passing a ground on its output lead 296. Schmitt trigger 295 passes an "off" signal from its inverse output to power switch PS5. PS5 inverts the signal passing a ground to one terminal of the operating coil for relay K1, the other terminal 297 of that coil being supplied from a suitable source of −12 volts (not shown). When K1 pulls in, it closes a contact K1–1 to force the velocity signal to ground in FIG. 9, closes the path at contacts K1–2 between amplifiers A2 and A3 in order to generate a decelerating signal and opens the ground at normally closed contact K1–3 to terminate the seal forcing signal $E_0$ to ground.

The digital logic involved in instituting a stopping sequence for the pattern where the maximum velocity has been attained by the pattern will now be considered. Under these circumstances relays K1 and K2 are operated simultaneously as is seen in FIG 10. The logic functions of this circuit parallel those for a stop initiation from the acceleration mode of the pattern. When "or" 307 is "on," it signifies that a stop can be made from maximum velocity of the pattern command as indicated on ascent by the difference between the difference between the destination signal and the present position signal $(X_{cr}-X_p)$ and the slowdown distance signal $X_{sd}$ becoming more negative or on a descent by the difference between $(X_{cr}-X_p)$ and $X_{sd}$ becoming more positive. If an ascending pattern has the signal difference between $(X_{cr}-X_p)$ and $X_{sd}$ positive or if a descending pattern has that signal difference negative, it signals that it has not yet advanced to the slowdown point. At the instant the displacement signal remaining to be generated to the call requirement is reduced to and below the displacement signal generated in the transition between zero and maximum velocity, the output from amplifier of A15 is inverted from a negative to a positive signal to buffer amplifier BA3 which in turn converts its output from an "off" or negative signal to a ground or "on" signal as it appears on lead 298. If a positive value of voltage appears as a velocity signual at junction 164 in FIG. 9 indicating an ascending pattern, it is applied through terminal 299 as a ground to the input of "or" 301 turning that circuit "on" and to the input of "and" 302. A coincidence of "on" inputs to "and" 302 will issue an "on" input to Schmitt trigger 303 whereby its inverse output 304 will issue an "off" signal to turn off "and" 305. This turns off Schmitt trigger 306 so that its inverse output issues an "on" signal to "or" 307 which transmits the "on" signal to input 308 for "and" 309.

A descending pattern with BA3 transferring from on to off due to the signal $X_{sd}$ producing a positive difference with the signal $(X_{cr}-X_p)$ and with the input at 299 "off," "or" 301 is "off," "and" 302 is "off," trigger 303 is "off," "and" 305 is "off," trigger 306 is "off" and "or" 307 is "on."

If with "or" 307 "on" all other inputs to "and" 309 are "on," as they will be if a run is in progress and the inverse RF signal is applied from terminal 215 of FIG. 9, if there is no acceleration signal so that absolute value circuit AV2 issues an "on" signal from its inverse output to lead 311 of "or" 312 supplying an "on" input on lead 313 to "and" 309 and if there is a no rate of change of acceleration signal from absolute value circuit AV3 inverse output as applied to lead 314 of "or" 315 supplying "and" input 316 with an "on" signal, then "and" 309 applies an "on" signal to Schmitt trigger 317. "On" trigger 317 seals "or" 307 by applying an "on" signal on lead 318. It also issues an "off" signal from its inverse output over lead 319 to "and" 281. As previously traced, when "and" 281 is turned off, relay K2 is energized and relay K1 is enabled. Since all other conditions prerequisite to the energization of K1 are satisfied at this time, K1 and K2 are energized simultaneously. The sequence as outlined above including the operations of relays K1 and K2 cause a breakover of the velocity curve and put the pattern velocity on a constant deceleration negative slope over the intervals $d_2$, $d_3$ and $d_4$ as shown in FIG. 11 or the intervals $b$ and $a$ shown in the velocity curve of FIG. 10.

Figure 16:
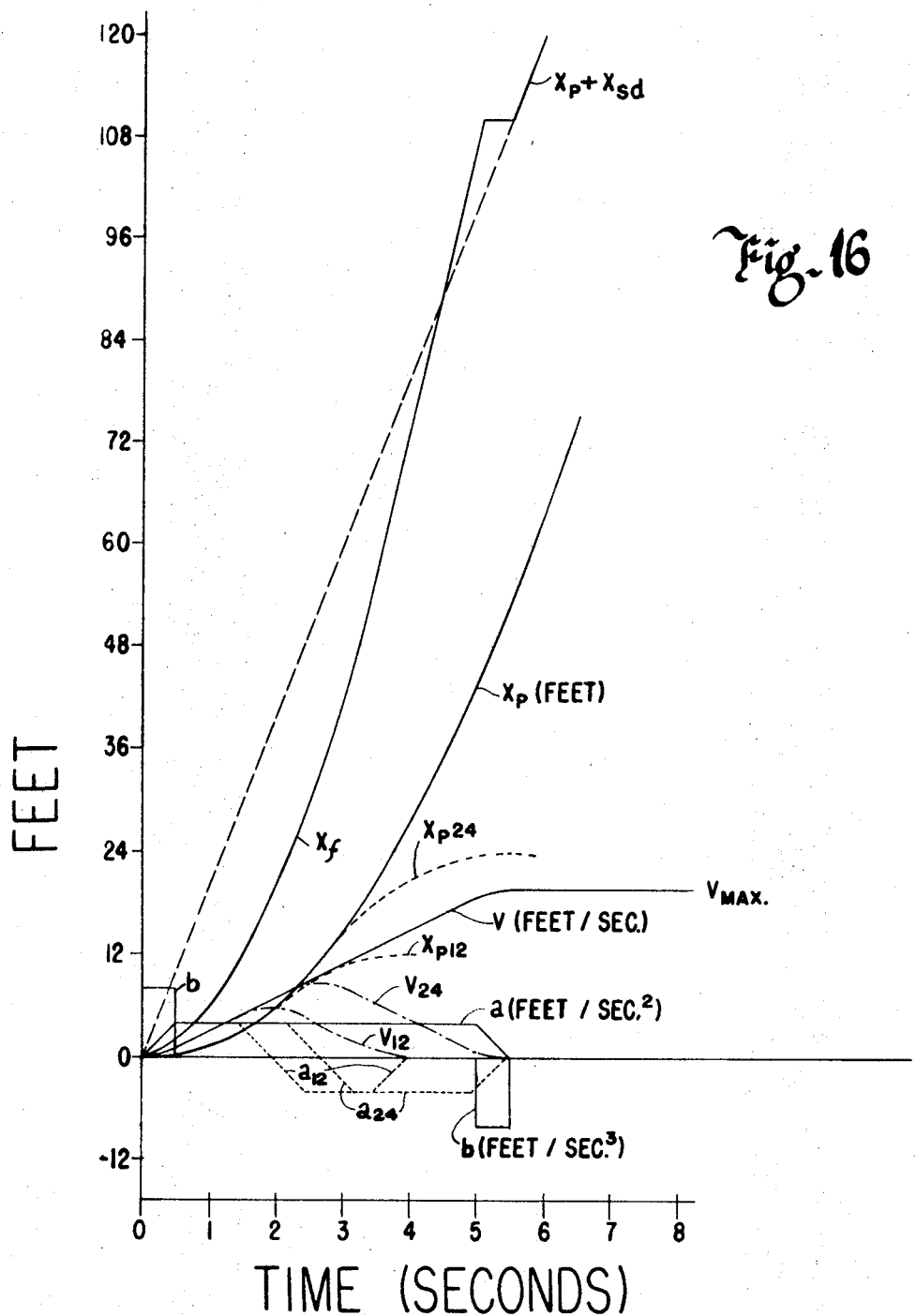
FIG. 16 is a plot against time of the slowdown distance, the displacement, the velocity, the acceleration and the rate of change of acceleration for a typical elevator controlled according to the present invention.

If the computed stopping position signal matches the destination signal during the transition from maximum acceleration to a constant maximum velocity portion of the pattern, the stopping position will be that which was computed at the initiation of the transition. This is shown in FIG. 16 where the slowdown distance curve has a flat region between those portions determined by $X_f$ and $X_p$ plus $X_{sd}$. Accordingly, during the transition the signal $X_f$ is stored to keep it available in the event a call is registered during that interval for a stop at that position in the elevator system subject to the command signals. This storage is controlled by relay K4 in FIG. 15.

As shown in FIG. 15, relay K4 is operated when the "and" circuit 321 is on. This occurs when a velocity signal is indicated from the absolute value circuit AV1 at "and" input 322, there is no maximum acceleration signal as indicated by the inverse output from absolute value circuit AV2 on input 323, and there is a rate of change of acceleration limit signal from the normal output of absolute value circuit AV3 on lead 324. Under these conditions, the pattern signal is approaching its peak value. The "on" signal is applied to Schmitt trigger 325 and causes an "off" signal to issue from its inverse output on lead 326 to power switch PS6 in which it is inverted to a ground completing the circuit for the operating coil of K4 from the negative twelve volt source (not shown) connected to terminal 328. With K4 energized, back contact K4–1 is opened to enable the storage of signal $X_f$ at its then current level in amplifier A17 and the input formerly connected to amplifier A17 is grounded through contact K4–2. Relay K4 drops at the completion of the transition to the maximum velocity since the input from absolute value circuit AV3 on lead 324 is turned off to turn off "and" 321.

Further summarizing the slowdown and stopping logic, relay K2 is operated when a stopping signal is received from either the top speed or acceleration stop channel of the stopping signal generator. It should be noted that when considering a run in which the acceleration is diminishing to zero on approaching top speed, such as the interval between times $T_2$ and $T_3$ in FIG. 10, the final stopping position is constant if a call is received at any time during this interval of duration $$T_A = \frac{a}{b}$$

Relay K4 operates at the time that this interval is entered and stores the value of $X_f$, the final stopping position, for the one second or so that is required to round the pattern off to the maximum velocity.

Relay K1 is operated when relay K2 is operated and acceleration and rate of change of acceleration are equal to zero. For a stop from the maximum velocity, acceleration and rate of change of acceleration are equal to zero since the velocity is constant and K1 will operate as soon as K2 operates. For a stop from the acceleration portion of a run, $K_1$ will not operate until the acceleration has diminished to zero from its maximum value. Detection of this condition is achieved by monitoring the rate of change of acceleration voltage $b$ and detecting that that signal is zero by means of the inverse output from absolute value circuit AV3. Relay K1 remains operated as long as K2 has not been dropped.

Relay K2 remains operated until the position voltage is landed at the destination and the inverse RF signal on lead 215 is "off." It disconnects amplifier A2 from the integrating amplifier A3 and forces the signal $E_0$ at junction 174 to zero. Under this condition, amplifier A3 sustains its output value $E_v$ at the level it had prior to the operation of K2. This ground also forces the acceleration signal supplied to the rate of change of acceleration limited pattern generator A4 and A5. Thus the acceleration pattern output of amplifiers A5 and A6 will go to zero at a rate determined by the rate of change of acceleration limits $\pm b$. When acceleration has reached zero, the voltage $E_j$ appearing at junction 184 which represents the rate of change of acceleration will become zero. At this time relay K1 operates. With the operation of relay K1 the shorting of $E_0$ to ground is removed, amplifier A2 is reconnected to integrating amplifier A3 and the input velocity to amplifier A2, V, is forced to zero by the closure of contact K1-1 to ground. At this instant the output of amplifier A3, $E_V$, is at the value held from the operation of relay K2 and the input to amplifier A2 is zero. This presents an error signal to A2 which provides an acceleration limited $E_0$ as it appears in FIGS. 10 and 11 to A3 in order to reduce $E_V$ to zero. It can be seen that the voltage $E_V$ represents the peak velocity that would be obtained, $E_V$ is the integration of the area under the acceleration curve up to the time that the stopping sequence was initiated and $E_0$ or acceleration forced to zero. By holding $E_V$ to this value until the input V to amplifier A2 is set to zero by relay K1, it is assured that the area under the deceleration curve is exactly equal in magnitude to the area under the acceleration curve. This will be true because if $E_V$ starts from zero and assumes a value and then is returned to zero, the area under the two $E_0(t)$ curves will be equal in magnitude and opposite in sign.

While the present invention contemplates employing the jerk limited final interval $d_5$ of FIG. 11 to bring the pattern to its destination, it is recognized that for precise positioning commands, such as required for a high quality passenger elevator, the several circuits employed can produce inaccuracies of a few inches in several hundred feet of travel. Accordingly, for precise final position control, a supplemental pattern base is provided employing a voltage precisely representing the location of the destination.

Successful operation of the position pattern as an elevator control requires that that pattern arrive and hold its destination voltage to within one tenth of an inch over the range of operation. In the present system a scale of one volt equals five feet is utilized. This requires repeatability and stability to within 1.6 millivolts of the desired destination voltage.

In order to establish this level of accuracy, a circuit is required to catch onto and pull the position voltage to the desired value when this voltage has been brought into the vicinity of the destination value by the pattern generator. It is also desirable that this circuit hold the position voltage regulating it against the destination voltage. This pull-in of the pattern signal to the destination voltage is instituted by the operation of relay RF discussed above. When relay RF is not operated, the input to integrator A8 is supplied from the velocity pattern. The integral of this velocity provides a position and if relay RF is not employed would follow a jerk limited pattern to the destination. When RF is operated, the input to A8 becomes a voltage proportional to distance from the destination as derived at terminal 198 and represented by the voltage $X_{cr}$. With this type of feedback the position pattern will approach the floor in an exponential manner. The position pattern will follow the form $$X(t) = X_r e - K_p t$$

where $$K_p = \frac{\text{velocity}}{\text{distance}} = \text{feet/seconds/feet} = \frac{1}{\text{second}}$$

$X_r$ = distance remaining at the instant of switchover

The logic provided by amplifier A10 and its related circuitry driving relay RF insures that at the instant of switchover the voltage supplied by A9 will be equal to the voltage that has been supplied by A7.

The examination of the point time on the generated pattern at which it would be appropriate to transfer from an initial position base to a destination base will now be undertaken. Since the pattern developed from the destination base is subject to the exponent $K_p$ to a zero velocity, it is desirable that the maximum deceleration be maintained for as long as it conveniently can be maintained without discontinuity in the pattern prior to the transition to control by the exponent $K_p$, in order to utilize as little time as possible in bringing the object to a smooth halt. It is also desirable that the same point be selected for all conditions set into the system where adjustments are available in the limits on the rate of change of acceleration, acceleration and velocity. Further, the transistion should occur at a low velocity so that the time to perform the comparision in the decision making logic is sufficient to avoid a significant difference in the velocity between the comparison and the transfer to the new pattern base. Finally, the condition under which the transfer should occur should be unique, that is, only one occurrence should be possible so that there is no abiguity in the decision making logic and the circuits will respond to these conditions in making the transfer without the need for further logic functions.

As discussed above, this transition occurs at the time that the velocity pattern signal which is generated has the relationship with respect to the position pattern signal which is generated which is equal to three times the rate of change of acceleration limit over the acceleration limit, $3b/a$. Further to insure a smooth transition, the voltage provided by amplifier A9 equals that provided by integrator A7 at the time of switchover. At the moment of equality relay RF is pulled to disconnect the velocity signal from the position signal generator and connect the destination signal $X_{cr}$ to the position signal generator A8. This connection is maintained by the "and" gate 209 until the drive controlled by the pattern is next set to run and ground is removed from terminal 212. Thus the signal from the amplifier A10-inverter combination need only be on for the interval required to turn on the gate 209 (one or two microseconds).

Inspection of FIGS. 10 and 11 reveal that the intervals of constant acceleration and deceleration and of the transition between zero velocity and constant acceleration or deceleration are symmetrical. Therefore the consideration of the relationship of velocity V to displacement X can be undertaken for the accelerating mode and then by appropriate transfer of coordinates converted to the decelerating mode. For the interval from zero velocity to maximum acceleration:

$$X = \frac{bt^3}{6}; \quad V = \frac{bt^2}{2}$$

where $t = T$.

$$\frac{X}{V} = \frac{\frac{bt^3}{6}}{\frac{bt^2}{2}} = \frac{t}{3} = \frac{T}{3}$$

$$T = T_A = \frac{a}{b}$$

$$\frac{X}{V} = \frac{a}{3b}$$

For the interval in which maximum acceleration persists:

$$X = \frac{at^2}{2} + V_1 t + X_1; \quad X = at + V_1$$

where $t = T - T_A$ and $$T_A = \frac{a}{b}$$

$$\frac{X}{V} = \frac{\frac{at^2}{2} + V_1 t + X_1}{at + V_1}$$

At the transition between these intervals set $t = t_1$ or $t_6$ $$\frac{X}{V} = \frac{T_A}{3} = \frac{a}{3b}$$

This is the same as indicated above for the termination of the interval from zero velocity to maximum acceleration.

Dividing the numerator by the denominator in the equation above gives:

$$\frac{X}{V}=\frac{t}{2}+\frac{V_1}{2a}+\frac{X_1-\frac{V_1}{2a}}{at+V_1}$$

Substituting $$t=T-\frac{a}{b}$$

$$X_1=\frac{bT_A{}^3}{6b^2}=\frac{a^2}{2b}$$

$$V_1=\frac{bT_A{}^3}{2}=\frac{a^2}{2b}$$

$$\frac{X}{V}=\frac{T}{2}-\frac{a}{2b}+\frac{a}{4b}+\frac{\frac{a^3}{6b^2}-\frac{a^3}{8b^2}}{aT-\frac{a^2}{b}+\frac{a^2}{2b}}$$

$$=\frac{T}{2}-\frac{a}{4b}+\frac{\frac{a^3}{24b^2}}{aT-\frac{a^2}{b}+\frac{a^2}{2b}}$$

$$=\frac{T}{2}-\frac{a}{4b}+\frac{\frac{a_3}{24b^2}}{aT-\frac{a^2}{2b}}$$

The uniqueness of the ratio at the transition between the intervals and thus the absence of ambiguity in that ratio as a criteria for switchover is evident from a consideration of the ratio during the two intervals:

$$\frac{X}{V}=\frac{T}{3}$$

during the interval of change of rate of acceleration where T is smaller than $T_A$; and $X/V$ is larger than $a/3b$ for all values of T larger than $T_A$ during the interval of constant acceleration since $$\frac{X}{V}=\frac{T}{2}-\frac{a}{4b}+\frac{\frac{a^3}{24b^2}}{aT-\frac{a^2}{2b}}$$

As noted throughout the preceding discussion, the velocity acceleration and rate of change of acceleration limits established by the diode clamps in the pattern generator shown in FIG. 9 can be adjusted by adjusting the voltages applied to those diodes. In making these adjustments the present system has been arranged with a scale of two volts equal to one foot per second[3] for the rate of change of acceleration value $b$, two volts equal one foot per second[2] for the acceleration value $a$, two volts equal one foot per second for the velocity value V, and one volt equal to five feet for the displacement value X. Further, in making adjustments in the selected values, particularly those of acceleration and rate of change of acceleration $a$ and $b$, provisions must be made for changing the gain of certain of the amplifiers where the ratio between $a$ and $b$ is utilized as a multiplying factor. This can be done by well known techniques, for example, by adjustment of resistors in the amplifier circuits. Amplifier A9 which is provided with a gain of thirty $b/a$ in order to achieve the desired relationship of velocity to displacement in the comparing functions provided by amplifier A10, when the transition from an initial position based pattern to a destination based pattern is made, must thus be adjusted in conjunction with the adjustment of either values $a$ or $b$ for the clamp circuits, and similar adjustment must be made for the amplifier A16 in the stopping pattern generator since its gain is equal to $a/b$. Further, the inputs through relay contacts K5-1 and K5-2 which contribute to the final stopping position signal $X_f$ will also require adjustment in their values in order to maintain the positive and negative values of the quantity $2a^3/3b^2$ required to satisfy the continuous computation effected in that circuit. These latter inputs can be adjusted by adjustment of voltage levels either through an adjustable power supply or the utilization of suitable resistors.

The patterns developed in the generators of the present invention have been applied to elevator controls where smooth, rapid and precise control of the position of an elevator car is required. One set of patterns suitable for such application is shown in FIG. 16 for an elevator having a maximum velocity V of 20 feet/second, a maximum acceleration of 4 feet/second[2], and a maximum rate of change of acceleration or jerk of 8 feet/second[3]. These curves are all plotted against time and include a plot of computed final stopping positions, $X_f$ as it appears at output terminal 264 of FIG. 13 until the end of the interval of maximum acceleration for a maximum velocity run at 5 seconds from start, then a constant during the transition from maximum acceleration to maximum velocity at 5.5 seconds followed by a constant lead over the computed position by an amount $X_{sd}$, as it appears on terminal 244 at the output of amplifier A13. The plot of computed displacement $X_p$ represents the absolute value of the signal as it appears at terminal 197 for a run attaining maximum velocity. In addition, displacement plots for elevator runs of 12 and 24 feet have been set forth in dashed lines labeled $X_p12$ and $X_p24$ to illustrate pattern signals for runs of less than that required to attain maximum velocity.

Velocity V, acceleration $a$, and rate of charge of acceleration $b$ with time have also been shown as plots against time for the stated parameters. The velocity plots have been shown for 12 and 24 foot runs in dot dashed plots to illustrate completion of a 12 foot run $V_{12}$ in 4 seconds and a 24 foot run $V_{24}$ in 5.5 seconds. Acceleration patterns to maximum velocity and for these runs have been shown in dotted lines as $a_{12}$ and $a_{24}$, and the rate of change of acceleration $b$ or jerk has been shown only for a maximum run and only in raising the car to maximum velocity. It should be noted that the slowdown from a maximum velocity run has not been set forth nor has the end of the displacement curve nor the acceleration curve for that portion of the run been shown.

Figure 17:
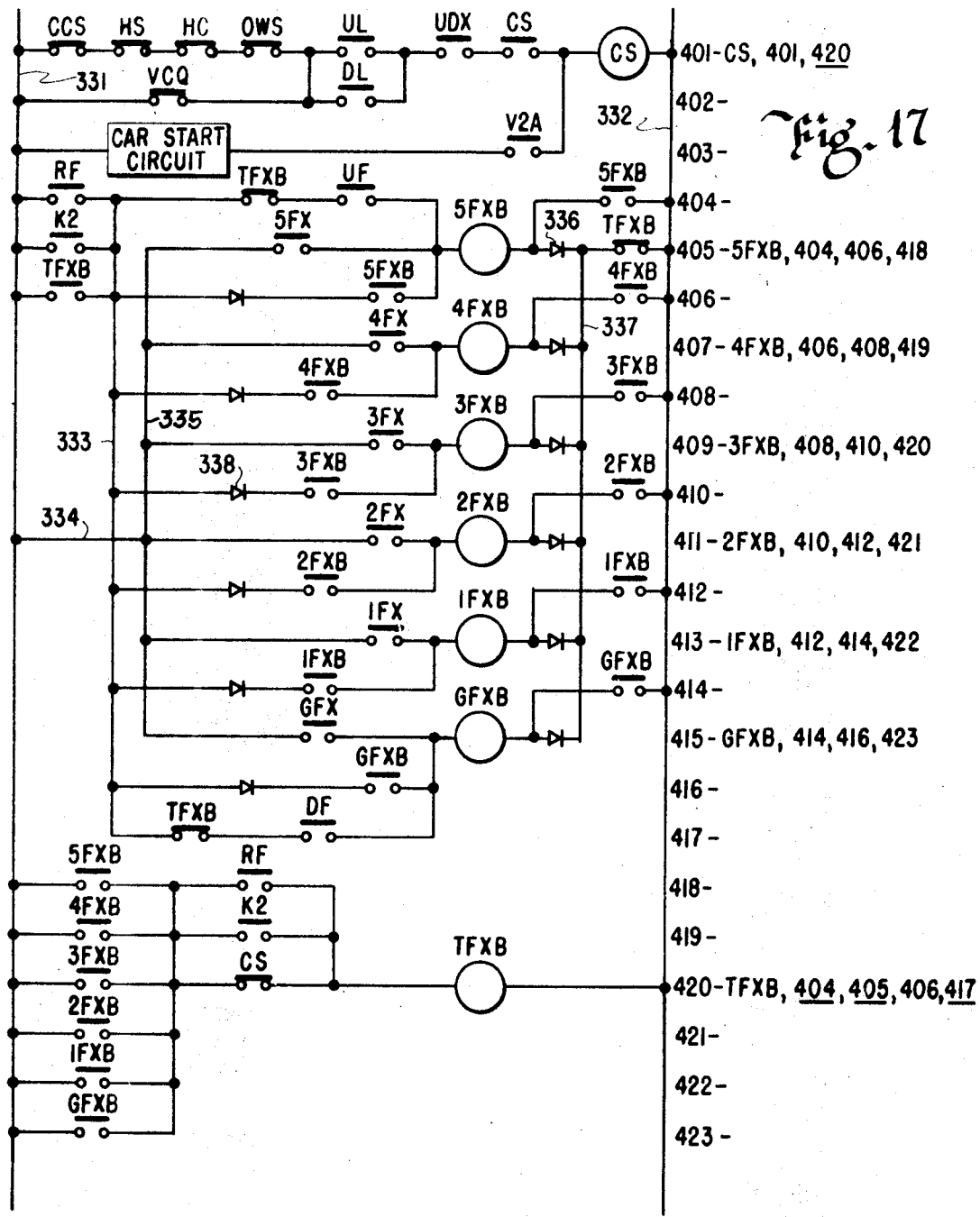
FIG. 17 is an across-the-line diagram of certain relay circuitry utilized in adapting the logic circuitry of the previously described elements to existing elevator controls.
Figure 18:
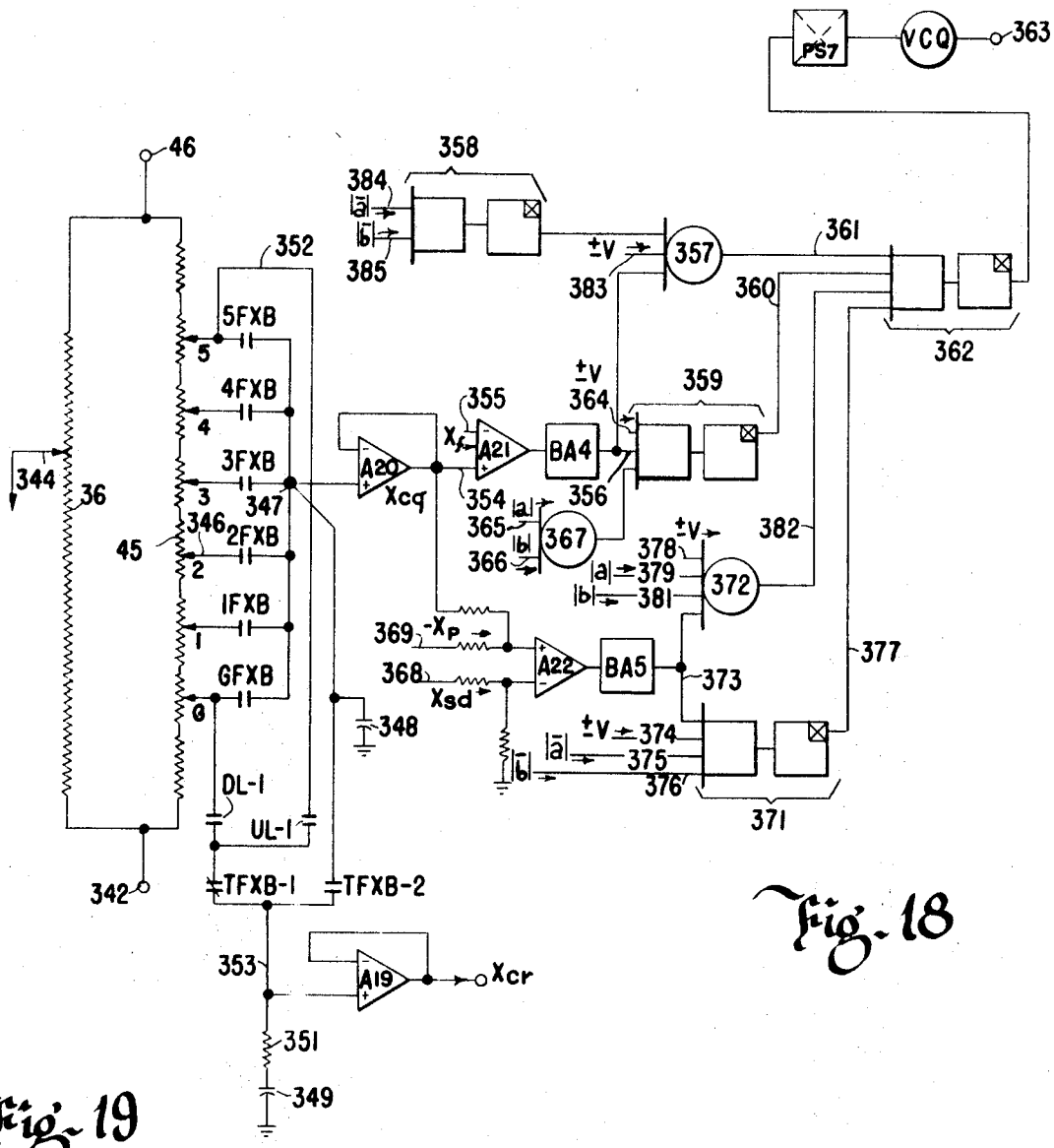
FIG. 18 is a call checking and accepting circuit schematic for an elevator control utilizing the command signal generator and stopping distance computer of FIGS. 9 and 13.

Throughout the preceding discussion reference has been made to a destination signal sometimes designated $X_{cr}$. For elevator applications this signal can be developed in a circuit as shown in FIG. 18 subject to the control afforded by the circuit of FIG. 17. The resultant signal will function in the control of the elevator through a portion of the circuit of FIG. 18.

An elevator is controlled by calls registered either by an attendant, a passenger or automatic equipment. In the present application it will be assumed that elevator movement is initiated in response to a call registered by a passenger in the car through the operation of car call registers individual to each landing served by the car (not shown) or by a prospective passenger at a landing registering an up or down call for that landing on an appropriate landing call register (not shown). The sequence placing the pattern generator in operation and conditioning the car and hoist motor to respond to the generated pattern can be considered from the operation of car start relay CS in response to a call (registered by means not shown). Once relay CS is energized, the car and hoist motor respond according to the generated displacement pattern until a stopping signal is encountered within limits acceptable to the stopping distance computer and relay CS is dropped. Relay CS is dropped employing familiar elevator stopping logic. Once the motion of the hoist motor or car is initiated for a regular run, as distinct from a releveling operation, the pull-in circuit for relay CS is opened and maintained open by contact V2A at 403 throughout the subsequent running, stopping and stop cycle until the next regular run is initiated. During this regular run, relay CS is held energized by the circuit illustrated at lines 401 and 402 of FIG. 17 until an acceptable call is encountered.

Throughout the preceding description schematic diagrams have been depicted. FIG. 17 has been presented in across-the-line form to facilitate its description. This drawing has been divided into horizontal bands or zones which have been indexed in the right-hand margin with the numbers 401 to 423. Relay coils have been shown with their actuating coils connected across leads 331 and 332 which are connected to a suitable source of energy and their contacts are located in general alignment with the elements they control. Where those contacts appear in FIG. 17, they have been related to the coils by indexing the coils in the margin adjacent the zone or line number of their location, and by listing the zone or line number of the contact location to the right of its symbol. Back contacts, those closed when their coil is deenergized and their armature released are distinguished from front contacts by underlining their location numbers in the index. As with all other figures, the contacts of FIG. 17 are shown in the condition they assume when their coil is deenergized and their armature released.

One form of floor selector progressively tests the car call, landing call, highest call and overtime wait call circuits for landings in advance of the actual position of the elevator and energizes an appropriate relay when such a call is encountered. These functions control car start relay CS by dropping that relay. Thus a traveling car will operate its car call stop relay CCS (not shown) to open contact CCS at 401 for the floor sufficiently in advance of that floor for the speed at which it is moving to enable the car to be slowed and stopped at that landing within the acceleration and jerk limits imposed. This operation is over a broader range of car travel than is desirable for defining the initiation of a stop sequence and is of sufficient breadth that a call can be registered in the sampling range. Hence a call rejection shunt, which precisely determines the moment of acceptance and the last possible instance in which a call can be accepted within the acceleration and jerk constraints is provided by call query acceptance relay VCQ of FIG. 18 which maintains CS energized by normally closed contact VCQ at 402 even though the circuit at 401 is open. Relay VCQ drops out during the interval calls are not acceptable and otherwise is energized during the running of the elevator. Similar call responsive relays having normally closed contacts at 401 for dropping relay CS include landing call relay HS, highest call stop relay HC and overtime wait call stop relay OWS. Each is subject to the selector testing in synchronism with that for car call stop relay CSS so that a landing call will be controlling, or in the case of an ascending car, the highest down landing call or car call will be controlling if no up landing calls exist at or above that highest call, or in the case of a call otherwise meeting the prerequisites for preferred service, a call registered for greater than a predetermined interval will be controlling.

In addition to the call control of the drop of relay CS, it is also dropped to enforce a stop by opening contact UL or DL at 401 or 402 any time the direction determining relay UL or DL (not shown) currently in effect is dropped to reverse the direction of travel. The generator field must be energized as indicated by closed contact UDX at 401 of auxiliary generator field relay, pulled when the field is energized for either up or down travel to hold relay CS. Further, relay CS seals itself at 401 by contact CS.

The selector mechanism operated by motion of the hoist motor or the car also operates floor index relays, exemplified by relays GFX through 5FX (not shown) for landings at the ground floor and floors 1 through 5, in synchronism with the sampling of calls for the floors. Thus these relays are energized while the car and hoist motor are driven over the range of travel at successive intervals which are advanced ahead of the car an amount depending upon the car speed and slowdown characteristics of the system. Contacts of these relays are shown at lines 405, 407, 409, 411, 413 and 415. A checking circuit utilizing information from the FX relays and information from the position pattern generator determines whether the pattern can be stopped at the floor indicated by the FX relay which is pulled at that moment. If the stop cannot be made because acceleration and jerk limits dictate that insufficient stopping distance is available, the call is rejected by dropping relay VCQ to negate the opening of any of the call stopping circuits located at line 401. This circuit is continuously monitoring the stopping capabilities at floors so that as long as the monitoring indicates a stop is permissible and relay VCQ remains energized, the normal call accepting logic of the elevator equipment will function. When relay CS has been dropped, the elevator system has accepted the call and the FX relay pulled at the time of the drop indicates the floor to which the car will run.

The remainder of the circuit of FIG. 17 is concerned with the floor indexing relays and a terminal stop assurance relay TFXB which appears at 420. During a run and up until the point that the deceleration cycle is initiated, car start relay CS is energized to open its back contact at 420 and relays K2 and RF of the digital logic associated with the pattern generators are both de-energized. Therefore, the terminal stop assurance relay TFXB is de-energized to enable energizing circuits to the FXB family of relays at back contacts TFXB at lines 404, 405 and 417. Front contact TFXB at 406 is open at this time together with the pattern generating digital logic responsive contacts RF and K2 at 404 and 405 whereby the seal circuit for any of the relays of family FXB is opened at lead 333. Accordingly, as the car proceeds upward along the hatchway, its floor selector progressively in an ascending order closes and then reopens before the following closure the contacts GFX, 1FX, 2FX and so forth. This completes the circuit from lead 331 through lead 334 to lead 335 enabling each of the respective FXB relays to be pulled in through blocking diodes 336 to lead 337, contact TFXB at line 405 and lead 332. As each FXB relay is energized, it closes contacts in the circuit of FIG. 18 to provide a call query signal $X_{cq}$ representative of the floor reference signal for the then currently available floor. When a call is accepted by the circuit in the manner to be described below, and relay CS at 401 is dropped, it closes its contact at 420 whereby the FXB relay in series with that contact completes a circuit energizing relay TFXB. With relay TFXB energized, it closes its contact at 406 to enable a seal circuit for the energized FXB relay, for example in the case of relay 3FXB, from lead 331 through contact TFXB, lead 333, contact 3FXB at line 410 and its blocking diode 338 to the energizing coil 3FXB and from that coil through contact 3FXB at 408 to lead 332. This second 3FXB contact bypasses the now open TFXB back contact at 405 which has disabled lead 337. Thus relay 3FXB will remain energized until the completion of the stopping logic inasmuch as the slowdown pattern transition is initiated, the relay K2 pulls in to close its contacts at 405 providing a seal to lead 333 for the FXB series of contacts, and its contact at 419 to provide a seal for the TFXB relay. Further, as the slowdown progresses to the transfer point wherein the pattern is based from the destination rather than from the initiation of travel so that relay RF is energized, RF contact at 404 is closed to maintain the seal to lead 333 and RF contact 418 is closed to maintain the seal to TFXB. It is the operation of TFXB which transfers the call requirement signal XCR from one corresponding to a terminal landing to the actual landing at which a stop is to be made. This will be set forth in the detailed description of FIG. 18.

In the event there is no signal registered, the car is automatically stopped at the limits of travel, in the illustration either at GFXB on a descending travel or 5FXB on an ascending travel, through the normally closed TFXB contacts at 417 and 404 respectively and the generator field relay contacts UF at 404, for an ascending car, or DF at 417 for a descending car. Thus the terminal landings are maintained as the reference landings for the slowdown computer and the slowdown logic under these circumstances and the lead 333 is energized by the operation of relay K2 to close contact K2 at 405 when the stop signal generator matches the computer stopping position to the signal representative of the terminal as a destination.

In FIG. 18 the position servo input and the floor reference position signals are derived from a common direct current power supply connected across terminals 46 and 342. The position servo input is derived from a potentiometer 36 having a wiper 344 which is advanced in accordance with car position to develop a voltage signal in accordance with that position. That voltage is utilized in the feedback loop of the hoist motor control. It is this signal that is compared with the time base generated pattern signal from the generator of FIG. 9 to establish the error signal controlling the hoist motor. A resistor string 45 having an individual resistor for each landing precisely adjusted by means of a tap 346 provides a position signal for the landing corresponding precisely to the signal derived from the potentiometer when the car is level with that landing. Thus each of the leads extending from the taps 346 are numbered according to the landing level from ground and one through five in the example, and each is provided with an FXB contact corresponding to that landing, coupled to a junction point 347. It is from junction point 347 that the call requirement signal $X_{cr}$ is derived through amplifier A19 and through which the call query signal $X_{cq}$ is derived through amplifier A20. Each of amplifiers A19 and A20 are used to prevent loading of the reference resistor chain by the various summing and control networks that monitor or use these reference voltages. When connected as shown, these amplifiers provide unity, non-inverting gain and are capable of presenting an extremely high input impedance from ten to 100 megohms to the reference resistor chain. The capacitor 348 maintains the input to amplifier A20 at its previous value when none of the FXB contacts are closed and thereby provides a continuity to the signal $X_{cq}$ during the interruptions in the connection of junction point 347 to the resistor chain 45. Capacitor 349 provides the same storage action for amplifier A19 during the transfer of the TFXB contacts while resistor 351 assures that upon transfer of these contacts the input to A19 instantaneously assumes its new value. The call required signal $X_{cr}$ derived from amplifier A19 and applied in both the pattern generator of FIG. 9 and the stop signal generator of FIG. 13 prior to the dropout of CS is the floor reference voltage supplied for a terminal landing in the direction of travel. This is dictated by the closed back contact TFXB–1 and the direction determining relay contact UL–1 for up direction or DL–1 for down direction which is operated. Thus if the car is asecnding, the call acceptance circuit receives a top terminal signal from the tap 346 connected to the line numbered 5 through lead 352, up direction determining relay contact UL–1, normally closed contact TFXB–1 and lead 353. If the car were traveling downward, it would receive the ground floor reference signal through G down direction determining relay contact DL–1 and the circuit following contact TFXB–1 as indicated. Under these conditions the position command voltage output of the pattern generator is traversing to the appropriate terminal in a controlled manner subject to the acceleration, velocity and jerk constraints set into the generator. Upon acceptance of a call and the drop of relay CS to seal an FXB relay for the landing at which the call is located, relay TFXB is operated to open its back contact TFXB–1 and close its front contact TFXB–2 whereby the input lead 353 to amplifier A19 is connected to junction point 347 and to the tap on the reference resistor chain corresponding to the floor for the FXB relay which is pulled. This results in the issuance from amplifier A19 of a call required signal $X_{cr}$ corresponding to that landing and precisely proportioned to match the car position potentiometer signal at the time that car is level with that landing.

As alluded to above with respect to FIG. 17, if for any reason no call is registered, the position command generated will land at the terminal landing in the direction of travel by virtue of the operation of relay K2 at the beginning of the slowdown cycle which closes its contact at line 405 to enable a circuit for relay 5XB through contact K2 at 405, lead 333, back contact TFXB at 404, contact UF for an ascending car at 404, relay 5FXB at 405, diode 336 and back contact TFXB at 405. Upon the pull in of relay 5FXB, relay TFXB is pulled thereby opening back contact TFXB at 404, with no effect at this time inasmuch as the seal circuit from lead 333 is completed at this time through seal contact 5FXB at 406. Thus the contact 5FXB in FIG. 18 is closed and the fifth floor reference signal is available at junction 347 until relay RF is dropped at the start of the next run by the pattern generator. At that time contacts RF a 404 and 418 open to drop TFXB and the FXB floor relay. Contact TFXB–1 is then closed to again apply a terminal position signal to A19.

Once a position command has been landed by the operation of an FXB relay and relay TFXB a destination voltage supplied to amplifier A19 remains unaltered as no additional FXB relays can operate in view of the opening of back contact TFXB at 405 breaking the path from lead 337 to lead 332 for that family of relays. Further, the TFXB relay cannot drop out because the RF relay is energized through the final stopping operation. Relay RF thus has several functions. It transfers the position command for the pattern generator from one based on an initial position to one based on the final or landed position and it seals the call required signal $X_{cr}$ from A19 to maintain it unchangeable as long as RF is energized. Thus with RF held through proper interlocks the command position cannot depart from the floor except under those conditions which satisfy all safety considerations provided by the interlocks.

The energization of relay VCQ to enable the elevator controls to accept a call is keyed to the inputs to composite "and" 362 so that "and" 362 must be off to enable the inverting power switch PS7 which it feeds to turn on relay VCQ. "And" 362 has four inputs each of which are "on" until a call acceptance condition is developed by the pattern command signal advance for one of those inputs. When that condition occurs, the coincidence of "on" signals to each input ceases and "and" 362 is turned "off." Input 361 enables call acceptance during an accelerating mode for a descending pattern command. Input 360 enables call acceptance during an accelerating mode for an ascending pattern command. Inputs 382 and 377 enable call acceptance during the constant maximum velocity mode for descending and ascending pattern commands respectively.

The call query signal $X_{cq}$ issued from amplifier A20 is employed in the stop signal acceptance logic of the circuit of FIG. 18 in a manner paralleling the stop signal generator function to the extent that two channels are provided. One channel is for a stop signal during the acceleration period of the generated pattern and the other is for a stop signal after the generated pattern has reached its maximum velocity. For a stop signal picked up during the accelerating portion of the pattern signal $X_{cq}$ is applied over lead 354 to the positive input of amplifier A21 and in that amplifier the difference between that signal and the final computed stopping position $X_f$ applied on lead 355 as derived from terminal 264 of FIG. 13 is found. This difference is applied through buffer amplifier BA4 so that if the absolute value of the call query voltage $X_{cq}$ is larger than $X_f$, the output from amplifier A21 is positive while if $X_f$ is larger than $X_{cq}$ the output from A21 will be negative. The buffer amplifier issues a logic "off" signal in response to a negative input and a logic "on" or ground signal to a positive input. Response to a call pickup has directional sensitivity as the output from buffer amplifier BA4 is divided into two paths on branches of lead 356 one of which feeds the "or" 357 for determining call acceptance conditions for a descending car while the other feeds the composite inverse "and" 359 for an ascending car. Thus, for a descending car, one having the buffer amplifier BA1 of FIG. 9 for the velocity signal V imposes an "off" on lead 383, if A21 is "off" or its output negative so that the buffer amplifier issues an "off" signal to "or" 357 as whenever $X_{cq}$ is less than $X_f$, and if either the acceleration $a$ or jerk $b$ have a value so that the inverse outputs from absolute value circuits AV2 or AV3 are "off" at leads 384 and 385 and "and" 358 issues an "off," all of the inputs to "or" 357 will be "off." "Or" 357 will issue an "off" signal on lead 361 to "and" 362 whereby "and" 362 will issue an "off" signal to power switch PS7. The "off" to PS7 is inverted to provide a ground for relay VCQ whereby its actuating coil is maintained energized from the source of negative 12 volts (not shown), applied at terminal 363. Under these circumstances, a descending car, which encounters a stop call, finds the stop call acceptable and drops relay CS to initiate the slowdown from its accelerating mode. If the pattern command had been in another mode "or" 357 would have indicated an "on" signal to 361 and if all other circuits having inputs to "and" 361 were on the relay VCQ would have been dropped. Thus a pattern in the constant velocity mode would cause "and" 358 to be "on" and a pattern for ascent would cause lead 383 to be "on."

An ascending accelerating pattern is monitored for call acceptance by the "and" 359. If all inputs to that "and" are on, the "and" will issue an "off" signal from its inverse output lead 360 to "and" 362 thereby maintaining relay VCQ energized. Considering the inputs to "and" 359, that circuit is responsive to an ascending pattern since a positive or ascending velocity will apply an "on" signal from buffer amplifier BA1 in FIG. 9 to input lead 364. If the call query signal is greater than the instantaneous computed stopping position signal, an "on" signal appears on lead 356. If either an absolute value of acceleration $|a|$ is indicated from circuit AV2 normal output in FIG. 9 on lead 365 or an absolute value of jerk $|b|$ is indicated from circuit AV3 in FIG. 9 on lead 366, "or" 367 issues an "on" to "and" 359. When all these conditions are met to provide an "on" signal at each input to 359 the call is acceptable to the pattern and VCQ remains energized, to permit the dropping of relay CS through the normal pick up circuits. If any of these conditions are not met, at least one input to 359 will be "off" and "and" 359 will issue an "on" signal on lead 360.

In the call acceptance circuits for any pattern which has reached its maximum velocity and no longer is experiencing either acceleration $a$ or jerk $b$, the amplifier A22 and its associated circuits enters into the logic. This amplifier compares a measured stopping distance signal $X_{sd}$ required to stop from maximum velocity, as imposed on lead 368 and as derived from terminal 244 of FIG. 13, against the distance that the command position signal $X_p$, as applied in negative form from terminal 197 to lead 369, is from the floor currently being considered for a stop as indicated by the signal $X_{cq}$ on the branch of lead 354. If the distance to go as determined by the quantity $X_{cq}$ minus $X_p$ is greater than the stopping distance as represented by $X_{sd}$ the output of amplifier A22 will be positive. If the difference $X_{cq}$ minus $X_p$ is less than the value of $X_{sd}$ the output from amplifier A22 will be negative. Buffer amplifier BA5 converts these outputs such that a positive signal is a logic "on" and a negative signal is a logic "off."

As discussed with respect to a stop acceptance during an accelerating portion of the pattern, stop acceptance during the maximum velocity of the pattern as derived from "and" 371 and "or" 372 is indicated by a logic "off" signal to the "and" 362, which will enable the relay VCQ to be held energized. For an ascending trip the "and" 371 enters into the logic by requiring an "on" signal to each of its inputs, thus if the difference between $X_{cq}$ and $X_p$ is greater than the signal for slowdown distance $X_{sd}$ a logic "on" signal is available for buffer amplifier BA5 to lead 373. If the elevator is ascending, so that a positive velocity signal is supplied lead 374 from the buffer amplifier BA1, if there is no value of acceleration $|a|$ or jerk $|b|$ as indicated by an "on" output from each of the absolute value circuits AV2 and AV3 on leads 375 and 376, the conditions of coincidence of "on" signals on all inputs to "and" 371 is met and the inverse output of that "and" issues a logical "off" signal on lead 377 to "and" 362, whereby relay VCQ remains energized to indicate that a call is acceptable. An indication of acceleration or jerk or a descending pattern will produce an "off" signal to "and" 371 and result in an "on" on lead 377 which will prevent energization of relay VCQ by this portion of the circuit.

For a descending car the logic requires no "on" input to be available to any of the input leads to "or" 372. This condition is met if the output from buffer amplifier BA5 is "off" indicating that the difference $(X_{cq}-X_p)$ is less than the signal $X_{sd}$. If the velocity is negative as derived from buffer amplifier BA1 of FIG. 9 and indicated on lead 378 as an "off" signal, if there is no value of acceleration or jerk as indicated by "off" signals on the inverse outputs from absolute value circuits AV2 and AV3 on leads 379 and 381, "or" 372 will issue an "off" signal on lead 382 to the input of "and" 362 and will maintain relay VCQ energized. The presence of jerk or acceleration or of an ascending signal will turn on "or" 372 and prevent energization of relay VCQ by this portion of the circuit.

Summing the pattern signal $X_p$ and the car position signal from potentiometer 36 algebraically at signal summer 38 produces an error signal which must be amplified to be effective as a control for the hoist motor 31 of the elevator. However when sufficient amplification is applied to swamp out the errors which occur due to unbalanced car loads in the positioning of the elevator car with respect to the commanded position the system becomes unstable. This instability is overcome by suitable adjustment of the phase and gain with signal frequency around the feedback loop. Accordingly, the factors which establish the gain requirements and the phase shifting and gain adjustments with frequency of the signal will now be undertaken.

Figure 19:
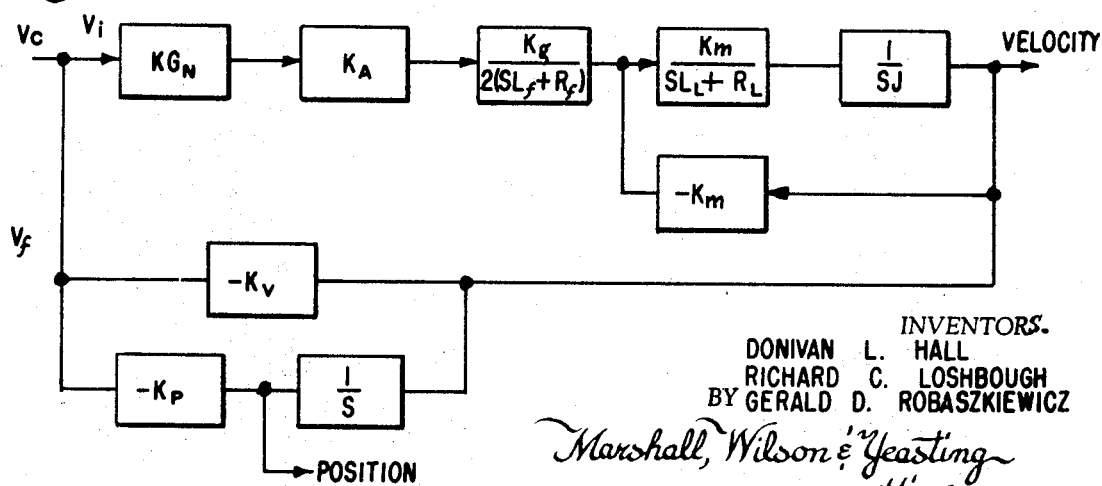
FIG. 19 is a block diagram of a position loop control as applied to an elevator control.

The block diagram of FIG. 19 represents an inner loop including the back E.M.F. of an elevator hoist motor. This loop comprises the elements $$K_m/SL_L+R_L$$

$1/SJ$, and $-K_m$ where "S" is an operator employed in conventional La Place Operational Calculus. The operator "S" in this method of analysis effects a conversion from the "$t$" (time) domain to the "S" domain in accordance with the following relationship:

$$\alpha[f'(t)]=SF(S)-f(0)$$

The operator 'S' and other servo analysis techniques, including those known as "Bode Plots" as shown in FIGS. 21 to 24 are referred to and employed to explain a means of achieving stability in a high gain system. FIG. 19 also represents the outer loop of a feedback system employing a position feedback signal provided at $1/S$ and $-K_p$ to produce a $V_f$ signal and a position command signal $V_c$ from the position command generator discussed above. The system considered also includes a hoist motor speed signal feedback, derived either from the back E.M.F. or a tachometer, $-K_v$, which is employed to provide a positive phase shift of 90° in the loop characteristics. Alternatives are available to provide this shift including lead-lag networks or, as in the case of the curves of FIGS. 23, 24 and 25 a function amplifier can be employed.

The net signal from the summing point, $V_1$, is applied through compensators $KG_N$, a buffer amplifier $K_A$, a generator having a gain $K_g$ for its two shunt field sections connected in series and equivalent parallel field inductance $L_f$ and resistance $R_f$ to produce the element $$K_g/2(SL_f+R_f)$$

when fields are in parallel. The inner loop is completed by $$K_m/SL_L+R_L$$

and $1/SJ$.

The general application of the present invention to the control of an elevator hoist motor can be appreciated from a consideration of a direct current hoist motor control system equivalent circuit comprising an amplifier having a gain $K$, to which is applied an input voltage $V$ and from which an output voltage $V_2$ issues to a loop including a series connected resistance $R_L$ representing the loop resistance including amplifier output resistance, lead resistance, brush resistance and motor armature resistance, a total loop inductance $L_L$ and a source representing the hoist motor effects. The hoist motor has a motor constant $K_m$ having units of volts/radian/second, a back E.M.F. $V_b$, a shaft velocity $v$ in radians/second, a load inertia reflected back to the hoist motor armature $J$ (in kilogram meters$^2$), and an unbalanced torque reflected back to the hoist motor armature of $T_0$ in Newton meters. In this equivalent circuit loop current is the output voltage less the motor back E.M.F. divided by the impedance:

$$I(S)=\frac{V_2(S)-V_b(S)}{SL_L-R_L} \quad (1)$$

The hoist motor output torque is:

$$T=K_mI \quad (2)$$

Substituting (1) in (2):

$$T(S)=K_m\frac{V_2(S)-V_b(S)}{SL_L+R_L} \quad (3)$$

Motor back E.M.F. can be related to shaft velocity as torque is related to current in (2):

$$V_b(S)=K_mv(S) \quad (4)$$

Substituting (4) in (3):

$$T(S)=K_m\frac{V_2(S)-K_mv(S)}{SL_L+R_L} \quad (5)$$

The torque required to move a load at speed $v$:

$$T(S)=JSv(S)\pm T_0(S) \quad (6)$$

where the first expression represents the inertia effects of a balanced elevator, and the second represents the unbalanced load. The sign on the unbalanced load depends upon whether it is in the direction to aid or oppose the torque developed in the motor.

Equating 5 and 6 to provide the relationship of input torque to output:

$$JSv(S)\pm T_0(S)=K_m\frac{V_2(S)-K_mv(S)}{SL_L+R_L} \quad (7)$$

Solving (7) for velocity $v$:

$$v(S)=\frac{K_mV_2(S)}{JS(SL_L+R_L)+K_m^2}\pm\frac{T_0(S)(SL_L+R_L)}{JS(SL_L+R_L)+K_m^2} \quad (8)$$

For an amplifier driving the motor which is a motor generator set including a direct current generator having a constant speed drive for its armature, an output voltage at its armature of $V_g=V_2$, an input voltage at its shunt field of $V_i$, a gain $K_i$ to the shunt field, a shunt field inductance of $L_f$, a shunt field resistance of $R_f$ and a generator constant $K_g$ in volts per ampere the gain will take the form $$K_g=\frac{K_i}{SL_f+R_f} \quad (9)$$

D.C. gain is:

$$K_{dc}=\frac{K_i}{R_f} \quad (10)$$

Then:

$$V_2=\frac{K_iV_i}{SL_f+R_f} \quad (11)$$

where:

$$K_i=\frac{K_gK_AK}{2} \quad (12)$$

Substituting Equation 11 in Equation 8 and gathering terms the equation for velocity is:

$$v(S)=\frac{K_mK_iV_i(S)\pm T_0(S)(SL_L+R_L)(SL_f+R_f)}{[JS(SL_L+R_L)+K_m^2](SL_f+R_f)} \quad (13)$$

Assigning the value B to gain between the position signal source and the summing point of FIG. 19, the feedback signal $V_f$ is:

$$V_f=\frac{Bv}{S} \quad (14)$$

$$v=\frac{SV_f}{B} \quad (15)$$

Substituting Equation 15 into Equation 13:

$$V_f(S)=\frac{BK_mK_iV_i(S)\pm BT_0(S)(SL_L+R_L)(SL_f+R_f)}{S[JS(SL_L+R_L)+K_m^2](SL_f+R_f)} \quad (16)$$

If the input signal $V_i$ for a position control system $$V_i=V_c-V_f \quad (17)$$

is substituted into Equation 16 and if the denominator of Equation 16 is assigned to value D for simplification of the expression:

$$V_f(S) = \frac{BK_mK_i[V_c(S)-V_f(S)]\pm BT_0(S)(SL_L+R_L)(SL_f+R_f)}{D} \quad (18)$$

$$V_f(S)=\frac{BK_mK_iV_c(S)\pm BT_0(S)(SL_L+R_L)(SL_f+R_f)}{D+BK_mK_i} \quad (19)$$

the position P can be equated in terms of $V_f$ from FIG. 19 to provide an expression for the closed loop system as:

$$V_f=BP \quad (20)$$

so that:

$$P=\frac{V_f}{B} \quad (21)$$

and substituting (21) into (19):

$$P(S)=\frac{K_mK_iV_c(S)\pm T_0(S)(SL_L+R_L)(SL_f+R_f)}{D+BK_mK_i} \quad (22)$$

Assuming $V_c$ equals 0 and applying the final value theorem to solve for the position error $P_e$:

$$P_e = \frac{T_o R_L R_f}{B K_m K_i} \quad (23)$$

This is the expression for the closed loop position error. The allowable error in the elevator system under consideration is plus or minus 0.1 inch. Converting this to radians where the drum over which the hoisting cables are trained has a diameter of thirty inches:

$$P_{\text{allowable}} = 0.1 \text{ inch} \times \frac{2 \text{ radius}}{30 \text{ inches}} = .0067 \text{ radian} \quad (24)$$

This allowable error will be considered with respect to a system having a thirty kva. generator driving a motor having a constant, $K_g$, of 87 volts/ampere, the generator shunt field resistance $R_f$ is 12 ohms, the generator field inductance $L_f$ is 6 henries, the loop inductance $L_L$ is 0.0145 henry, the loop resistance $R_L$ is 0.175 ohm and the motor constant $K_m$ is thirty Newton-meters per ampere. In this exemplary system the elevator car has a capacity of 3000 pounds, an empty car weight of 6100 pounds, and is counterweighted to 40% of rated capacity so that for full load operation the inertia J is 922 kilogram-meters$^2$ per radian and the torque is 3051 Newton meters. Inserting the allowable position error in Equation 23 and utilizing the above constants, the required gain to reduce the error to this amount with a full load on the elevator is:

$$BK_m K_i = \frac{3051(.175)(12)}{.0067} = 956,000 \quad (25)$$

A gain vs. frequency plot for this system can be obtained by evaluating the gain at a frequency point. In order to simplify the calculation, a frequency value of $w = 1$ is used. This calculation can be made employing Equation 16 by letting $S = jw$ and assuming $T_0 = 0$.

$$\frac{V_f}{V_i} = \frac{BK_m K_i}{jw[Jjw(jwL_L + R_L) + K_m^2](jwL_f + R_f)} \quad (26)$$

$$= \frac{956,000 \angle 0°}{(13.4 \angle 26.6°)(1 \angle 90°)(900 \angle 10.6°)}$$

$$= 79 \angle -127°$$

$$= 38 \text{db} \angle -127°$$

It can be shown from Equation 16 that the factor S in the denominator is attributable to the position feedback signal. Further, it can be shown that the quadratic in the denominator represents are hoist motor armature circuit and that the quantity $(SL_f + R_f)$ is attributable to the generator shunt field. Further, a pure S in the denominator of a transfer function is represented on a semilogarithmic plot of gain against the logarithm of frequency in radians/second as a continuous —20 db per decade and on a semilogarithmic plot of phase shift in degrees against the logarithm of frequency in radians/second has a phase shift which is constant at —90°. It can further be shown that the quantity in the denominator associated with the generator shunt field has a break or corner frequency in radians/second of $$W_{nf} = \frac{R_f}{L_f} \quad (27)$$

and that the quadratic has a natural resonant frequency in radians/second of $$W_{na} = \frac{K_m}{(JL_L)^{1/2}} \quad (28)$$

These values can be employed to ascertain the operating characteristics of a hoist motor system of the type under consideration by means of a graphical analysis plotted on a semilogarithmic basis. In this analysis the asymptotes of the curve for gain in decibels vs. frequency in radians/second and the phase response in degrees of phase shift vs. frequency in radians/second is set forth. This form of gain portrayal enables a composite curve to be constructed representing the attenuation in the system as a series of asymptotes since the corner or break frequencies of the elements occur at the zero gain value and the first order equations representing an element are altered at a rate of twenty decibels per decade while quadratic equations representing an element are altered at a rate of forty decibels per decade. On a semilogarithmic plot the products of such elements can be summed graphically.

In elevator hoist motor analysis, experience has shown that a phase margin of 45° affords an acceptably stable system, a system damped to a factor of approximately 0.7. The frequency at which the composite phase shift of the system reaches —135° (the 45° phase margin) defines the zero gain level for this degree of stability. Hence the composite gain curve can be drawn from this frequency to indicate system characteristics.

Figure 21:
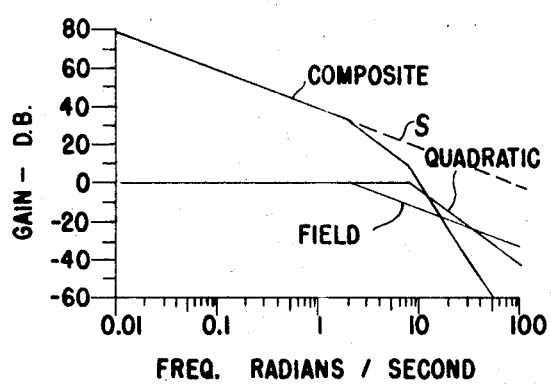
Figure 22:
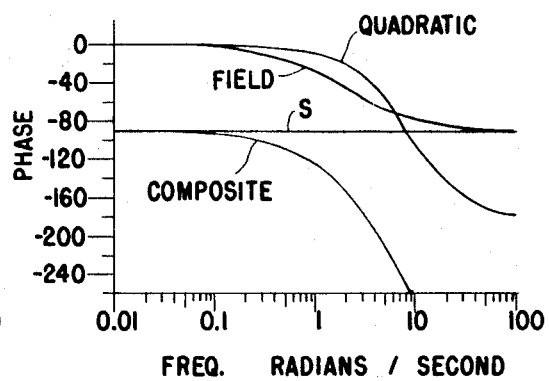

From the above the curves of FIGS. 21–24 can be developed. For FIG. 21 the generator shunt field asymptote will have a slope of —20 decibels per decade and a zero gain intercept from Equation 27 of 2 radians/second. The quadratic component will have a slope of —40 db per decade and a zero gain intercept from Equation 28 of 8 radians/second. These asymptotes are shown in FIGS. 21 and 23 and are labeled "field" and "quadratic." The location of the asymptote for the factor S on the gain curves defines the location of the composite curve. It will be noted that the curve S has a decay at a rate of —20 db per decade. The composite curve is drawn as the sum of the curves for the elements. This curve can be placed at any level for analysis purposes since if stability requirements are met, its level is established by the effective gain around the forward loop of the system. As can be seen from the curve that level will decay with the slope attributable to the S element until the field becomes effective to impose attenuation at a frequency of 2 radians/second at which point the composite curve has a slope of —40 db per decade which it maintains until the quadratic element becomes effective at 8 radians/second. At frequencies above 8 radians/second the composite curve decays at a rate of —80 decibels per decade, the sum of all the decay rates in FIG. 21.

The phase vs. frequency curves of FIGS. 22 and 24 can be considered as made up of individual elements in the same manner as the gain vs. frequency curves to which they correspond in FIGS. 21 and 23 respectively. The uncompensated curve of FIG. 22 shows a phase shift attributable to the field which extends from zero at zero frequency to —90° at infinite frequency and has a 45° phase shift at the break or corner frequency of 2 radians/second. The phase shift due to the quadratic element is zero at zero frequency and is —180° at infinite frequency. It has a 90° phase shift at its break or corner frequency of 8 radians/second and has a form dependent upon the damping which is applied. The phase shift component due to the factor S is a flat —90° for all values of frequency. The sum of these curves in FIG. 22 provides a composite curve. In order for the system represented by curves of the type shown in FIGS. 21 to 24 to be stable, the open loop characteristic represented in the curves must exhibit less than 180° of phase shift at any frequency in the range of interest at which the gain is greater than zero decibels.

The composite curve of gain vs. frequency of FIG. 21 for the asymptotes of the several terms is referenced to the computed gain of 38 decibels at 1 radian/second to represent the system characteristics which provide the desired displacement error correction. This curve is formed by a pure S term at frequencies up to .2 radian, the break frequency of the field term. Above this frequency its contribution is represented by a dashed line to distinguish it from the solid line of the composite curve. An examination of FIG. 22 reveals that the composite phase vs. frequency curve exceeds —180° at a frequency of approximately 3 radians/second. From FIG. 21 the gain at 3 radians/second is 25 decibels. The system therefore is not capable of the desired error correction since it will be unstable.

In FIG. 23 a composite curve of the asymptotes of gain vs. frequency for the open loop system is shown with the addition of the necessary compensating element to stabilize the system with the required displacement error correcting ability. This curve is developed by first noting the amount of phase compensation needed at the frequency determined by the desired system bandwidth. In the case shown this is 10 radians/second. From inspection of the composite phase shift curve of FIG. 22 it is determined that at 10 radians/second the shift is −273°. If the 45° phase margin is to be realized at this frequency, a positive phase shift of 138° must be introduced. A convenient source of such a shift is two elements each introducing 69° of positive phase shift at this frequency. In considering the phase correction the effect of any added elements on the gain of 10 radians/second must also be taken into account. Thus, if two lead networks were to be employed, by graphical construction it is found that their break frequencies would occur at 3.8 radians/second. The effect of lead networks with break frequencies at 3.8 radians/second on the gain at 10 radians/second would be to increase gain by 17 decibels. This additional gain can be compensated by the use of lag-lead networks.

Experience has shown that when economically practical components are employed in lag-lead networks to provide the required attenuation, there will be some phase lag at 10 radians/second. An allowance of 5° is included for this resulting in setting by graphical analysis the lead network break frequency at 2.8 radians/second rather than 3.8 radians/second. Also an additional 3 decibels of gain margin has been provided to slightly increase the closed loop damping of the system. The line representing the term S on the gain vs. frequency plot can now be placed at a slope of −20 decibels per decade and passing through 41 decibels (the calculated 38 decibels plus the additional 3 decibels) at 1 radian/second.

From these known asymptotes and phase relationships the lag-lead asymptotes can be placed. If the gain from the several known terms as summed at 10 radians/second, it is found that a positive gain of 21 decibels is attributable to the S term, a positive gain of 22 decibels is attributable to the two leads placed at 2.8 radians second, a negative gain of 4 decibels is attributable to the quadratic term, and a negative gain of 14 decibels is due to the field term to produce a net positive gain of 25 decibels. Since the system characteristics sought include zero decibel gain at 10 radians/second, it is necessary to insert a net attenuation of 25 decibels at this frequency. This criterion coupled with the net 5° phase shift tolerable at 10 radians/second enables a graphical determination of the correct location for the lag and lead break frequencies of the lag-lead networks to be utilized. These frequencies are found at 0.2 radian/second for the lag component and 0.85 radian/second for the lead component. Note that at 0.85 radian/second there is a difference of −25 decibels between the two curves which is maintained above this frequency by their equal and opposite slopes, that the phase curves of FIG. 24 for the lag and lead components of the lag-lead networks provide a net phase shift at 10 radians/second of 5°, and that the 45° phase margin at 10 radians/second is indicated from the composite phase shift of −135°. Thus, this system affords the requisite stability over the frequency range of interest by providing a 25 decibel cut in gain, a 45° phase margin at 10 radians/second, and less than 180° of phase shift at all frequencies below 10 radians/second.

The phase and gain characteristics of an open-loop hoist motor system predicts the stability of that system with the loop closed. Thus a system with the compensating networks and gain illustrated in FIG. 19 having the characteristics of FIGS. 23 and 24 will be stable although slightly underdamped as indicated by the plot of system relative gain vs. frequency shown in FIG. 25. A tendency of the system to increase its relative gain in the frequency range of about 0.3 radian/second to about 2 radians/second can be attributed to the dip in the composite phase curve of FIG. 24 at these frequencies resulting from the two superposed lag-lead characteristics. If desired this could be avoided by separating the break points of the lag and lead components of each compensating lag-lead from those of the other. The system also has a slight tendency to increase in relative gain near the upper limit of its frequency range. This tendency is damped sufficiently so that multiple oscillation are avoided and at still higher frequencies the signals are attenuated severely.

As shown in FIG. 19 a hoist motor speed voltage feedback is utilized to provide a portion of the lead. Graphically this lead is represented on the plots of FIGS. 23 and 24 as superimposed on the leading component of a single lead-lag network. Thus it has a break frequency of 2.8 radians/second and is included with the plot having the double label "lead-lag" and "lead." This lead is placed by adjusting the amount of feedback. If $K_v$ as depicted in FIG. 19 is the speed voltage feedback constant and $K_p$ is the position signal feedback constant the equation of the lead is:

$$K_p + SK_v \tag{29}$$

$$K_p + SK_v = K_v \left(S + \frac{K_p}{K_v}\right) \tag{30}$$

Setting $$K_p/K_v = 2.8 \tag{31}$$

$$K_v = \frac{K_p}{2.8} \tag{32}$$

The other leads and lags are introduced by the composite network of FIG. 20. This network is the equivalent of two lag-lead networks in cascade each having a lag break frequency of 0.2 radian/second and a lead break frequency of 0.85 radian/second and a cascaded lead-lag network having a lead break frequency at 2.8 radians/second and a lag break frequency at 50 radians/second. The composite network is made up of resistances 388 and 391 of 82,000 ohms, 389 and 392 of 27,000 ohms and capacitances 390 and 391 of 50 microfarads and 394 of one microfarad.

From the above description it will be appreciated that the present system is particularly well suited for the control of elevators and in fact provides a mathematically rigorous ideal elevator command signal of both velocity and position with respect to time. When utilized with high gain amplifiers and suitable compensation, the elevator hoist motor can thus be forced to follow closely the commanded pattern signal with a resultant superior operating pattern. The pattern command and stop computation elements of the system are based solely upon time and are quite independent of the position of the elevator.

The commanded position generator produces a position signal as a function of time by first generating a jerk pattern which is limited in magnitude of the electrical signal utilized in accordance with the limits of jerk to be imposed upon the commanded signal and is limited in the interval that it is effective in accordance with the magnitude of acceleration which is to be tolerated. During any changes in the rate of acceleration a constant jerk is imposed. Further, means are provided to limit the acceleration to a constant value once the jerk constraints have been satisfied for the predetermined interval necessary to attain the predetermined acceleration. Acceleration is maintained at its constant level for an interval up to a predetermined maximum velocity and thereafter the transition from maximum acceleration to maximum velocity is again subject to the constraints of the jerk. Thus an ideal pattern is developed from the standpoint of the commanded flight time involved inasmuch as any change in the rate of acceleration is at the constant preselected value, all acceleration is at a constant preselected value once the acceleration value has been attained through the transition subject to the jerk constraints, and all intervals of maximum velocity are immediately entered from the maximum acceleration interval subject only to the jerk constraints in the transition between the two intervals.

These constraints are developed by means of circuitry applying step inputs to an integrator and thereby producing a ramp output. The velocity constraint is achieved as a step signal V which is clamped to a positive value for an ascending command and a negative value for a descending command. This sets the level to which the ramp extends. The ramp slope is set by a clamp on the velocity signal step input to the integrator A3 to produce a curve $E_v$ of FIGS. 10 and 11. Since the input to the integrator A3 producing signal $E_v$ is the derivative of signal $E_v$, that input $E_o$ represents an acceleration signal subject to velocity and acceleration constraints. This step function is applied to integrator A6 subject to jerk constraint of clamps 188 and 189 at its input so that acceleration signals having ramp terminations is generated as $E_A$. The ramp slope is determined by the clamping level to determine the jerk of the acceleration pattern. Again viewing the input to the integrator to ascertain the derivative of the jerk, acceleration and velocity constrained acceleration pattern $E_A$ at the output of A6 a jerk pattern is seen as the curve $E_j$ in FIGS. 10 and 11. Each of these constraints can be adjusted independently in the circuits of FIG. 9 with the results that the adjustments of clamps 168 and 169 for V, velocity, change the area under the curve $E_A$ by extending or contracting the interval of constant maximum value for $E_A$; adjustments of clamps 175 and 176 for $a$, acceleration, change the magnitude of the constant maximum value for $E_A$; and adjustment of clamps 188 and 189 for $b$, jerk, change the slope of the curve $E_A$ during its transitions between zero and its maximum value. It should be noted that the curve $E_A$ also affords a basis for displacement command signals as determined by the interval maximum velocity is sustained between the positive and negative areas under the curve. Thus a first integration with respect to time of an acceleration curve subject to adjustable constraints of jerk, acceleration, and velocity provides a velocity command signal subject to the constraints, and a second integration with respect to time provides a displacement or position command signal subject to the constraints. Viewed in another sense the clamp to the value V determines the termination of the interval in which a constant value of acceleration or deceleration is maintained for any given value of acceleration since the arrival of the ramp $E_v$ at the maximum value or at zero terminates constant acceleration as can be seen from FIGS. 9 and 10 curves $E_v$, $E_0$ and $E_A$ at times $t_2$ and $t_6$. Similarly the value $a$ determines the termination of the interval in which a constant value of jerk of either a positive or negative sign is maintained for any given value of constant jerk since the arrival of the ramp $E_A$ at the maximum value or at zero terminates cnstant jerk as can be seen from curves $E_A$ and $E_j$ of FIGS. 9 and 10.

Thus once an idealized jerk pattern has been generated, both as to magnitude, the interval the jerk is applied, the sign of the jerk and the spacing between intervals of effective jerk limitation, the signal is integrated electrically to produce an acceleration signal which is introduced initially with a ramp function having a constant slope to a maximum value during the period of jerk constraint. Thereafter it is maintained at the maximum value during a period of acceleration constraint. It is then reduced, subject to the negative value of jerk constraint, to zero. Thereafter it is maintained at zero so long as maximum velocity is desired and then enters a negative or deceleration period through the jerk constraints to maximum deceleration, the maintenance of maximum deceleration for a predetermined interval until zero velocity is approached, and then a transition from maximum deceleration to zero velocity subject again to the jerk constraints. This acceleration signal is integrated with respect to time to produce a velocity signal and finally the velocity signal is integrated with respect to time to produce a commanded position signal.

The velocity signal commanded with respect to time can be considered to consist of a series of contiguous intervals. In the first interval as the signal commanded is brought up to the required acceleration rate, the rate of acceleration increases according to the jerk constraints. At the end of that interval a second interval is initiated throughout which constant acceleration is maintained. As maximum velocity is approached the system automatically enters a period subject to jerk constraints to make the transition to maximum velocity. If a commanded position signal is to maintain maximum velocity for some period, this interval follows as a fourth interval. Thereafter the commanded signal is brought to a stop subject to the constraints of jerk and acceleration through a fifth interval in which jerk constraints are imposed to cause a constant rate of change from zero to the maximum rate of deceleration or negative acceleration. A sixth period contiguous with the fifth period follows in which constant negative acceleration of deceleration prevails followed automatically as the pattern approaches zero velocity by a seventh interval in which the jerk constraints are again imposed to change the rate of deceleration to zero.

The resulting commanded velocity pattern has a mirror image relationship around a time axis centered in the maximum velocity interval or where no maximum rated velocity is attained at the maximum velocity for the run. The accelerating portion of the commanded velocity signal comprising the aforenoted first, second and third intervals therefore is enantiomorphously related to the decelerating portion comprising the fifth, sixth and seventh intervals. This relationship lends itself to highly precise computation of the stopping distances so that maximum velocity, first derivative with respect to time of the commanded position signal, is maintained for the greatest interval possible subject to the constraints of jerk and acceleration imposed.

While the above discussed pattern is ideal, over very substantial displacements errors can occur which will produce minor discrepencies in position. Accordingly, in elevator practice where a fraction of an inch error over several hundred feet is to be avoided, the base of the commanded position signal can be shifted for a final approach of a few inches to the destination. This shift is accomplished by transferring the base for the commanded position signal from the initial position signal derived from the commanded position generator at its last preceding stop to the destination signal. Such transfer can be accomplished advantageously by monitoring the relationship between commanded velocity and commanded position at amplifier A10 of FIG. 9. Once the transfer has occurred the final few inches of commanded position signal are controlled by a time decay to the destination signal value.

The velocity constraints are imposed upon the pattern described by means of the diode clamps 168 and 169 of FIG. 9 and are adjustable by means of the voltage sources 154 and 155 applied to those diodes. Similarly the acceleration clamps are imposed by diodes 175 and 176 and are adjusted by voltage sources 156 and 157 and the jerk constraints by diodes 188 and 189 and are adjusted by voltage sources 158 and 159. The first integration of the jerk signal occurs through the differential amplifier A6 and its associated circuitry while the second integration occurs in differential amplifier A7 and its associated circuits to produce a velocity command signal $\dot{X}_p$ at terminal 193 and the third integration occurs in amplifier A8 and its associated circuitry to produce a commanded position signal with respect to time and $X_p$ at terminal 197.

This time base commanded position signal as applied to an elevator system accommodates itself to the random imposition of service demands along the path of travel of the elevator through its cooperation with a stop position computer as shown in FIG. 13. In order that these logic functions can be performed, the generator of the position signal is provided with means for sensing the sign of the velocity signal imposed by means of buffer amplifier BA1. It is also provided with means to sense the presence of a velocity signal by means of absolute value circuit AV1 and to sense the presence or absence of acceleration components and jerk components in the signal by means of the absolute value circuits AV2 and AV3. Means are provided in the pattern generator to develop an initial signal $X_i$ by the storage function of stabilized differential amplifier A11 which is coupled to the output of the commanded position signal generator through contact RF-7 when the commanded signal is not changing, as signified by the energization of relay RF. Thus the last signal condition prior to the initiation of a change of signal is inserted into amplifier A11 and stored there for utilization in the decision making functions of the stopping circuit.

Another adjunct to the stopping position computer is the means for developing a destination signal for the computed pattern signal, the signal $X_{cr}$ of FIG. 18, from differential amplifier A19. That signal during the initial portion of a run is based upon a terminal in the direction that the commanded pattern is advancing and when an acceptable demand for service is encountered, that signal is transferred to a signal characteristic of the location of that demand along the path of travel of the elevator through the operation of the relays TFXB and the FXB family of landing relays.

Two channels of stopping computation logic are provided in FIG. 13. One affords means for computing the final stopping position continuously for a stop initiated any time during the acceleration of the pattern. This signal $X_f$ is stored in amplifier A17 and is developed in that amplifier by means of the summing circuits from amplifier A16 defining the product of the current velocity in the ratio of acceleration limit, $a$, to jerk limit, $b$, the current commanded position signal at resistor 254 and the initial position signal at resistor 252 in conjunction with either a positive or negative signal scaled appropriately from the value to $a^3/b^2$. The final stopping position signal as computed $X_f$ is compared with the destination signal $X_{cr}$ in amplifier A18 and is utilized to control the stopping of the commanded position pattern through the operation of relays K2 and K1 dependent upon the relationship developed in amplifier A18, the sign of the voltage signal V as indicated at terminal 268, and the presence of either an acceleration component or a jerk component in the commanded position signal indicated at leads 273 and 274. The second stop computation channel in FIG. 13 is effective after the commanded position signal has attained its maximum velocity. This channel stores the displacement signal characteristic of the amount of commanded displacement required to make the transition between zero velocity and maximum velocity as a slowdown signal $X_{sd}$ in amplifier A13 and compares that signal with the distance remaining to be traversed by the commanded pattern signal as determined by the difference between the current value of the commanded pattern signal and the destination signal. The effects of this comparison are passed through amplifier A15 to the decision making elements of the logic circuit and when the proper coincidence of velocity sign, as ascertained at terminal 299, and the absence of either an acceleration or a jerk component is signaled, indicating that maximum velocity conditions prevail, this circuit simultaneously operates relays K1 and K2 to initiate the slowdown of the commanded position signal.

The resultant mathematically rigorous ideal commanded position signal is applied through a summing circuit as indicated at 38 in FIG. 1 in which it is compared with an actual elevator car position signal derived from potentiometer 36 to produce an error signal which in turn controls the hoist motor of the elevator. In order for this error signal to be effective in reducing the position error to the requisite level, a high gain amplifier and suitable compensators are employed so that the net gain around the feedback loop is sufficient to reduce the error signal and the gain and phase shift are controlled with respect to frequency by the compensators to avoid instability in system operation.

While a commanded position signal generated from the signal pattern generator is contemplated for use in this invention throughout the entire pattern including the final portion of the signal generation interval to its destination value as developed from the intial position signal as a base, advantageously in the final portion of the interval the signal base is transferred to a precisely defined destination signal as established in resistor string 45 of FIGS. 1 and 18. Further, after the pattern is forced to the signal level established by the setting in the resistor string 45 for the landing approached that signal level is utilized as the initial position signal level in the next pattern to be generated. Thus, with the resistance string precisely adjusted and the elevator stopped, the signal $X_{cr}$ from A19 affords an accurate pattern base to terminal 198 of FIG. 9 through relay contact RF-5 to amplifier A8 and storage A11 to establish the signal $X_i$. This element of this signal is developed independently of the elevator position as are the other aspects of the velocity and position command signals and the stopping signals as computed for those command signals.

The actual elevator car position is represented by a voltage developed across a portion of a potentiometer. The destination voltage is produced by the settings of a resistor string so that at each stop station, each landing served by the car, the voltage developed in the string to the resistor setting for that landing matches the voltage from the potentiometer. Advantageously both the potentiometer and the resistor string are supplied with the same voltage, most conveniently from the same source. Under these circumstances the flight time of the elevator can be changed simply by adjusting the voltage applied to the potentiometer and resistance string since a higher voltage appears as a longer run to the command position signal generator and requires a greater flight time while a lower voltage appears as a shorter run and produces a shorter flight time.

While the system has been disclosed for utilization in the control of the motion of an elevator through the control of its hoist motor, it is to be appreciated that it might similarly be applied to any movable object which is driven by a means subject to the type of control disclosed here, although it is to be recognized that ordinarily drives of this type do not require the precision in control afforded by the jerk limited patterns set forth. Further, it should be appreciated that alternative forms of amplifiers, logic elements and power sources might be employed to achieve the control functions employed both in the command pattern generation and the stop computation logic. Accordingly, the present disclosure should be read as illustrative of the invention and not in a restrictive sense.

Having described the invention, we claim:

1. A position control system for an element comprising a drive motor; an element driven by said motor; a path along which said element is driven; means to generate an electrical signal in response to and characteristic of the position of said element along said path; means to generate an acceleration command signal as a function of time for said element; means to restrict changes of acceleration signal from said acceleration command signal generating means to a predetermined, constant rate of change of acceleration signal; means to limit the magnitude of the acceleration command signal to a predetermined maximum value during constant acceleration; means to limit the time interval the acceleration command signal is continuously imposed; means to integrate said acceleration signal as a function of time; means to integrate said integrated signal as a function of time to generate a jerk limited, acceleration limited, and velocity limited position command signal as a function of time for said element; means combining said command position signal and said position signal of said element to produce an error signal, and a control for said motor responsive to said error signal and tending to reduce said error signal.

2. An elevator control system comprising an elevator hoist motor, a car driven by said hoist motor, means defining a path along which said car is driven, means to generate an electrical signal in response to and characteristic of the position of said car along said path, means to generate a signal which is the second derivative with respect to time of a commanded position signal, the commanded position signal at any instant being characteristic of a position of said car along said path, means effective for an initial period to increase the signal which is the second derivative with respect to time of the commanded position signal from zero to a predetermined value at a constant rate with respect to time, means for maintaining the signal which is the sceond derivative with respect to time of the commanded position signal at said predetermined value for a second period contiguous in time with said initial period, means to integrate twice with respect to time the signal which is the second derivative with respect to time of the command position signal to produce the commanded signal, means combining said commanded and said car responsive position signals to produce an error signal, and a control for said hoist motor responsive to said error signal.

3. A combination according to claim 2 including means effective for a third period contiguous with said second period to decrease the second derivative with respect to time of said commanded position signal from said predetermined value to zero at said constant rate with respect to time.

4. A combination according to claim 3 including means effective for a fourth period subsequent to said third period to increase the second derivative with respect to time of said commanded position signal from zero to the opposite sign of said predetermined value and the absolute value of said predetermined value at said constant rate with respect to time.

5. A combination according to claim 4 including means effective for a fifth period of equal length to said second period and contiguous in time to said fourth period to maintain the second derivative with respect to time of said commanded position signal constant at the opposite sign of said predetermined value and the absolute value of said predetermined value, and means effective for a sixth period contiguous to said fifth period to decrease the second derivative with respect to time of said commanded position signal from said predetermined value to zero at said constant rate with respect to time.

6. An elevator control system comprising an elevator hoist motor, a car driven by said hoist motor, means defining a path along which said car is driven, a plurality of landings spaced along said path and served by said car, means to generate an electrical signal in response to and characteristic of the position of said car along said path, means to generate a signal characteristic of an initial position assigned the car while stopped at a landing, means to generate a destination signal characteristic of a position along said path remote from the initial position of said car, means to generate a commanded position signal as a function of time and based upon said initial position signal, said commanded position signal at any instant being characteristic of a position of said car along said path, means to supersede said initial position signal base with said destination signal as a base for said commanded position signal in response to a given commanded position signal, means combining said commanded and said car responsive position signals to produce an error signal, and a control for said hoist motor responsive to said error signal.

7. An elevator control system comprising an elevator hoist motor, a car driven by said hoist motor, means defining a path along which said car is driven, a plurality of landings spaced along said path and served by said car, means to generate an electrical signal in response to and characteristic of the position of said car along said path, means to generate a signal characteristic of an initial position assigned the car while stopped at a landing, means to generate a destination signal characteristic of a position along said path remote from the initial position of said car, means to generate a commanded position signal as a function of time and based upon said initial position signal, said commanded position signal at any instant being characteristic of a position of said car along said path, means to generate a signal characteristic of the first derivative with respect to time of said commanded position signal, means to supersede said initial position signal base with said destination signal as a base for said commanded position signal when said first derivative signal has a predetermined relationship to said commanded position signal, means combining said commanded and said car responsive position signals to produce an error signal, and a control for said hoist motor responsive to said error signal.

8. An elevator control system comprising an elevator hoist motor, a car driven by said hoist motor, means defining a path along which said car is driven, a plurality of landings spaced along said path and served by said car, means to generate an electrical signal in response to and characteristic of the position of said car along said path, means to generate a signal characteristic of an initial position assigned the car while stopped at a landing, means to generate a destination signal characteristic of a position along said path remote from the initial position of said car, means to generate a commanded position signal as a function of time and based upon said initial position signal, said commanded position signal at any instant being characteristic of a position of said car along said path, means to maintain the third derivative with respect to time of said commanded position pattern at a constant, discrete, absolute value, $b$, during all changes in the value of the second derivative with respect to time of said commanded position pattern, means to maintain said second derivative with respect to time of said commanded position pattern at a constant, discrete, absolute value, $a$, for an interval, means to generate a signal characteristic of the first derivative with respect to time of said commanded position signal, means to supersede said initial position signal base with said destination signal as a base for said commanded position signal when said commanded postion signal is related to said first derivative signal as $a/3b$.

9. A combination according to claim 6 including means to force said commanded position signal into coincidence with said destination signal value.

10. A combination according to claim 6 including means to force said commanded position signal into coincidence with said destination signal value as an exponential function of time.

11. An elevator control system comprising an elevator hoist motor, a car driven by said hoist motor, means defining a path along which said car is driven, means to generate an electrical signal in response to and characteristic of the position of said car along said path, means to generate a commanded position signal as a function of time, said commanded position signal at any instant being characteristic of a position of said car along said path, signal storage means, means effective while said commanded position signal remains unchanged for any of a plurality of commanded positions for applying said signal to said storage means to establish an initial position signal in said storage means, means to sum the stored signal from said signal storage means with said generated commanded position signal, means combining said summed signals and said car responsive position signals to produce an error signal and a control for said hoist motor responsive to said error signal.

12. A combination according to claim 11 including input means for said storage means, and means responsive to the initiation of a new commanded position signal generation to disconnect said commanded position signal from said input means for said storage means.

13. Apparatus for generating a commanded position signal as a function of time for an object to be driven in response to said signal comprising means for generating a first signal having a value representative of a rate of change of said signal representing acceleration, means for limiting the absolute value of said first signal to a predetermined constant value, means for generating a second signal having a value representative of a maximum signal level of acceleration, means for limiting the absolute value of said second signal, means for generating a third signal having a value representative of the maximum velocity for said object, means limiting the absolute value of said third signal, means maintaining said first signal generator operative for a first interval to generate a constantly increasing signal of a first sign representative of a transition from zero velocity and acceleration to maximum acceleration of said first sign, means maintaining said second signal generator operative for a second interval to generate a constant signal of said first sign representative to a constant maximum acceleration of said first sign, means maintaining said first signal generator operative for a third interval to generate a constantly decreasing signal of said first sign representative of a transition from maximum acceleration to maximum velocity and zero acceleration, means maintaining zero acceleration signal for an interval dependent upon the displacement required of said object, means maintaining said first signal generator operative for a fifth interval to generate a constantly increasing signal of a second sign opposite said first sign representative of a transition from maximum velocity to maximum acceleration of said second sign, and means maintaining said second signal generator operative for a sixth interval to generate a constant acceleration of said second sign until said velocity is a predetermined value.

14. In combination means for generating a commanded position signal as a function of time, a driven object, drive means for said object controlled by said commanded position signal electrical signal, detecting means to detect the presence of jerk in said commanded position signal, and means to issue a logic signal having no proportionality relationship to the magnitude of detected jerk in response to the presence of jerk detected by said detecting means, whereby the current mode of generation of the commanded position signal is indicated.

15. In combination means for generating a commanded position signal as a function of time, a driven object, drive means for said object controlled by said commanded position signal, electrical signal detecting means to detect the absence of jerk in said commanded position signal, and means to issue a logic signal in response to the absence of jerk detected by said detecting means, whereby the current mode of generation of the commanded position signal is indicated.

16. In combination means for generating a commanded position signal as a function of time, a driven object, drive means for said object controlled by said commanded position signal, electrical signal detecting means to detect the presence of acceleration in said commanded position signal, and means to issue a logic signal having no proportionality relationship to the magnitude of detected acceleration in response to the presence of acceleration detected by said detecting means, whereby the current mode of generation of the commanded position signal is indicated.

17. In combination means for generating a commanded position signal as a function of time, a driven object, drive means for said object controlled by said commanded position signal, electrical signal detecting means to detect the absence of acceleration in said commanded position signal, and means to issue a logic signal in response to the absence of acceleration detected by said detecting means, whereby the current mode of generation of the commanded position signal is indicated.

18. In combination means for generating a commanded position signal as a function of time, a driven object, drive means for said object controlled by said commanded position signal, electrical signal detecting means to detect the presence of velocity in said commanded position signal, and means to issue a logic signal having no proportionality relationship to the magnitude of detected velocity in response to the presence of velocity detected by said detecting means, whereby the current mode of generation of the commanded position signal is indicated.

19. In combination means for generating a commanded position signal as a function of time, a driven object, drive means for said object controlled by said commanded position signal, electrical signal detecting means to detect the sign of velocity in said commanded position signal, and means to issue a first logic signal in response to the detection of a given sign of velocity by said detecting means and to issue a second signal in response to the detection of an opposite sign of velocity by said detecting means, whereby the current direction of generation of the commanded position signal is indicated.

20. In combination means for generating a commanded position signal as a function of time, a driven object, drive means for said object controlled by said commanded position signal, electrical means for restricting jerk in said commanded position signal to a predetermined constant value, and means to adjust said predetermined value.

21. In combination means for generating a commanded position signal as a function of time, a driven object, drive means for said object controlled by said commanded position signal, electrical means for restricting the jerk in said commanded position signal to a predetermined constant value, electrical means for restricting the acceleration in said commanded position signal to a predetermined value, and electrical means for restricting the velocity in said commanded position signal to a predetermined value.

22. A control system comprising a motor, an object driven by said motor, a path along which said object is driven, means to generate a commanded acceleration signal for said object as a function of time and having a predetermined value of acceleration and a predetermined value of maximum velocity, a source of a start signal for said signal generator, a clamp circuit to restrict a signal level to a magnitude correlated with said predetermined value of velocity, an amplifier having an input and an output, said clamp being connected to said input, means to apply said start signal to said amplifier input, an integrator having an input and an output, a second clamp circuit, said integrator input and said second clamp circuit being connected to said amplifier output, said second clamp having a threshold for a signal level correlated with said predetermined value of acceleration, a feedback path from said integrator output to said amplifier input, and a control for said motor responsive to the signal at said integrator input.

23. A combination according to claim 22 wherein said control for said motor includes a second amplifier having an input connected to said integrator input and an output, a second integrator having an input and an output, a third clamp circuit, said third clamp circuit and said second integrator input being connected to said second amplifier output, and a feedback circuit from said second integrator output to said second amplifier input, said third clamp circuit establishing a signal value correlated to a predetermined value of jerk whereby said commanded acceleration signal is constrained to said predetermined value of jerk.

24. A combination according to claim 11 including a plurality of signal sources each providing a signal level characteristic of a given position along said path, and means to connect a signal source corresponding to the position of said car along said path to said commanded position signal generator while said car is stationary.

25. In a positioning control system comprising a drive motor; an element driven by said motor; a path along which said element is driven; means for generating an electrical signal in response to and characteristic of the position of said element along said path; means to generate a position command signal; means combining said position signal and said position command signal to produce an error signal; and a control for said motor responsive to said error signal; the improvements comprising means to constrain said command signal to a predetermined constant rate of change of acceleration for all changes of acceleration; means to constrain said command signal to a predetermined constant acceleration between changes at said rate of change; means to constrain said command signal to a predetermined constant velocity between intervals of acceleration; first means for predicting the position at which said position command signal will terminate when termination is instituted during a constant acceleration operating mode of said position command signal; means responsive to the presence of a constant acceleration component in said position command signal for enabling said first predicting means; second means for predicting the position at which said position command signal will terminate when termination is instituted during a constant velocity operating mode of said position command signal; means responsive to the presence of a velocity component and the absence of an acceleration component in said position command signal for enabling said second predicting means; and means responsive to said first and second predicting means to initiate termination of said position command signal.

References Cited

UNITED STATES PATENTS

| | | | |
|---|---|---|---|
| 2,699,226 | 1/1955 | Bruns | 187—29 |
| 2,954,514 | 9/1960 | Hemstreet | 318—28 |
| 3,146,857 | 9/1964 | Bosshard | 187—29 |
| 3,187,243 | 6/1965 | Long | 318—6 |
| 3,012,180 | 12/1961 | Finvold. | |
| 3,350,612 | 10/1967 | Hansen et al. | 318—143 |

THOMAS E. LYNCH, Primary Examiner

U.S. Cl. X.R.

318—448; 187—29

UNITED STATES PATENT OFFICE
CERTIFICATE OF CORRECTION

Patent No. 3,523,232                    Dated   August 4, 1970

Inventor(s) Donivan L. Hall, Richard C. Loshbough & Gerald D. Robaszkiewicz

It is certified that error appears in the above-identified patent and that said Letters Patent are hereby corrected as shown below:

Column 1, line 26, "is" should be - - if - - .

Column 3, line 12, "frequency" should be - - frequently - - .

Column 15, line 69, "pot" should be - - plot - - .

Column 18, line 8, after "start" insert - - signal - - .

Column 22, lines 4 and 5, omit the following "Putting these two equalities into the $X^T$." ;

line 24, "$a^2$" should be - - $a^3$ - - .

Column 25, line 38, "signual" should be - - signal - - .

Column 37, line 42, "-" should be - -  +  - - .

Column 43, line 60, "cnstant" should be - - constant - - .

Column 50, line 30, after "second" insert - - logic - - .

Signed and sealed this 20th day of August 1974.

(SEAL)
Attest:

McCOY M. GIBSON, JR.            C. MARSHALL DANN
Attesting Officer               Commissioner of Patents